United States Patent
Watanabe et al.

(10) Patent No.: US 9,665,798 B2
(45) Date of Patent: May 30, 2017

(54) DEVICE AND METHOD FOR DETECTING SPECIFIED OBJECTS IN IMAGES USING METADATA

(75) Inventors: Yuki Watanabe, Tokyo (JP); Atsushi Hiroike, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 83 days.

(21) Appl. No.: 14/402,819

(22) PCT Filed: May 24, 2012

(86) PCT No.: PCT/JP2012/063322
§ 371 (c)(1),
(2), (4) Date: Mar. 11, 2015

(87) PCT Pub. No.: WO2013/175608
PCT Pub. Date: Nov. 28, 2013

(65) Prior Publication Data
US 2015/0286896 A1 Oct. 8, 2015

(51) Int. Cl.
*G06K 9/00* (2006.01)
*G06K 9/62* (2006.01)
*G06F 17/30* (2006.01)
*G06K 9/68* (2006.01)

(52) U.S. Cl.
CPC ..... *G06K 9/6228* (2013.01); *G06F 17/30247* (2013.01); *G06F 17/30259* (2013.01); *G06K 9/6256* (2013.01); *G06K 9/6807* (2013.01); *G06K 2209/21* (2013.01); *G06K 2209/27* (2013.01)

(58) Field of Classification Search
None
See application file for complete search history.

(56) References Cited

U.S. PATENT DOCUMENTS

| | | | | |
|---|---|---|---|---|
| 6,175,829 | B1 * | 1/2001 | Li | G06F 17/30247 |
| 7,668,814 | B2 * | 2/2010 | Il | G06F 17/30616 |
| | | | | 707/756 |
| 7,796,840 | B2 * | 9/2010 | Mori | G06K 9/00228 |
| | | | | 382/118 |

(Continued)

FOREIGN PATENT DOCUMENTS

| | | |
|---|---|---|
| CN | 1928887 A | 3/2007 |
| CN | 101025764 A | 8/2007 |

(Continued)

OTHER PUBLICATIONS

Nakazato, M., Manola, L., & Huang, T. S. (May 2002). Group-based interface for content-based image retrieval. In Proceedings of the Working Conference on Advanced Visual Interfaces (pp. 187-194). ACM.*

(Continued)

*Primary Examiner* — Vu Le
*Assistant Examiner* — Samah Beg
(74) *Attorney, Agent, or Firm* — Crowell & Moring LLP

(57) ABSTRACT

The purpose of the present invention is to provide an image analysis technique enabling a detection subject to be rapidly detected from image data. This image analysis device generates metadata for a query image containing the detection subject, and using the metadata, narrows down the image data serving as the search subject beforehand and then conducts object detection.

14 Claims, 16 Drawing Sheets

(56) References Cited

U.S. PATENT DOCUMENTS

| | | | |
|---|---|---|---|
| 8,320,626 B2 | 11/2012 | Higuchi et al. | |
| 8,577,131 B1* | 11/2013 | Li | G06K 9/6256 382/157 |
| 9,361,523 B1* | 6/2016 | Chen | G06K 9/00758 |
| 2003/0037251 A1* | 2/2003 | Frieder | G06F 21/552 726/23 |
| 2004/0064554 A1* | 4/2004 | Kuno | H04L 67/16 709/225 |
| 2007/0053614 A1 | 3/2007 | Mori et al. | |
| 2007/0239683 A1* | 10/2007 | Gallagher | G06F 17/30265 |
| 2007/0244925 A1* | 10/2007 | Albouze | G06F 17/30265 |
| 2008/0010060 A1* | 1/2008 | Asano | G06F 17/30032 704/10 |
| 2008/0097985 A1* | 4/2008 | Olstad | G06F 17/30997 |
| 2008/0152231 A1* | 6/2008 | Gokturk | G06F 17/30256 382/209 |
| 2009/0106699 A1* | 4/2009 | Kihara | G06F 3/04817 715/838 |
| 2009/0125560 A1* | 5/2009 | Munekuni | G06F 17/30265 |
| 2009/0150359 A1* | 6/2009 | Masuyama | G06F 17/30259 |
| 2009/0208116 A1* | 8/2009 | Gokturk | G06F 17/30259 382/209 |
| 2009/0234784 A1* | 9/2009 | Buriano | G06F 17/30035 706/12 |
| 2009/0259656 A1* | 10/2009 | Itoh | G06F 17/30864 |
| 2011/0138317 A1* | 6/2011 | Kang | G06F 3/011 715/780 |
| 2011/0182518 A1* | 7/2011 | Jeong | G06F 17/30265 382/190 |
| 2011/0305394 A1* | 12/2011 | Singer | G06F 17/30265 382/190 |
| 2012/0045132 A1* | 2/2012 | Wong | G06K 9/4676 382/195 |
| 2012/0062597 A1* | 3/2012 | Mori | G06F 17/30268 345/636 |
| 2012/0254790 A1* | 10/2012 | Colombino | G06F 3/0482 715/781 |
| 2012/0291072 A1* | 11/2012 | Maddison | G06F 17/3087 725/53 |
| 2013/0016899 A1* | 1/2013 | Li | G06K 9/6256 382/159 |
| 2013/0091082 A1* | 4/2013 | Pistoia | G06N 5/00 706/13 |
| 2013/0132366 A1* | 5/2013 | Pieper | G06F 17/30867 707/710 |
| 2013/0204892 A1* | 8/2013 | Kumaran | G06F 17/30864 707/766 |
| 2013/0254209 A1* | 9/2013 | Kang | G06F 17/30672 707/741 |
| 2013/0262505 A1* | 10/2013 | Buckley | G06F 17/30247 707/769 |
| 2013/0288702 A1* | 10/2013 | Abu-Alqumsan | G06F 17/30247 455/456.1 |
| 2014/0012853 A1* | 1/2014 | Watanabe | G06F 17/30011 707/738 |
| 2014/0149376 A1* | 5/2014 | Kutaragi | G06K 9/6224 707/706 |
| 2014/0214885 A1* | 7/2014 | Park | G06F 17/30784 707/769 |
| 2014/0222755 A1* | 8/2014 | Soderberg | G06F 17/30265 707/609 |
| 2015/0006573 A1* | 1/2015 | Fusume | G06F 17/30675 707/771 |
| 2015/0161129 A1* | 6/2015 | Miller | G06F 17/30017 707/728 |
| 2015/0310115 A1* | 10/2015 | Ryger | G06F 17/30011 707/708 |
| 2016/0196350 A1* | 7/2016 | Mau | G06F 17/30256 707/706 |
| 2016/0203238 A1* | 7/2016 | Cherniavskii | G06F 17/30321 707/722 |

FOREIGN PATENT DOCUMENTS

| | | |
|---|---|---|
| JP | 2004-362314 A | 12/2004 |
| JP | 2005-275847 A | 10/2005 |
| JP | 2010-3254 A | 1/2010 |

OTHER PUBLICATIONS

International Search Report (PCT/ISA/210) dated Jun. 26, 2012, with English translation (Three (3) pages).

Japanese language Written Opinion (PCT/ISA237) dated Jun. 26, 2012 (Three (3) pages).

Viola et al. Robust Real-time Object Detection, IJCV2001, vol. 57, No. 2, pp. 137-154, 2002, pp. 1-25.

Chinese-language Office Action issued in counterpart Chinese Application No. 201280073308.8 dated Oct. 25, 2016 (12 pages).

* cited by examiner

FIG. 2
| Image ID | Image data | Image feature | Bibliographic information |
|---|---|---|---|
| 1 | 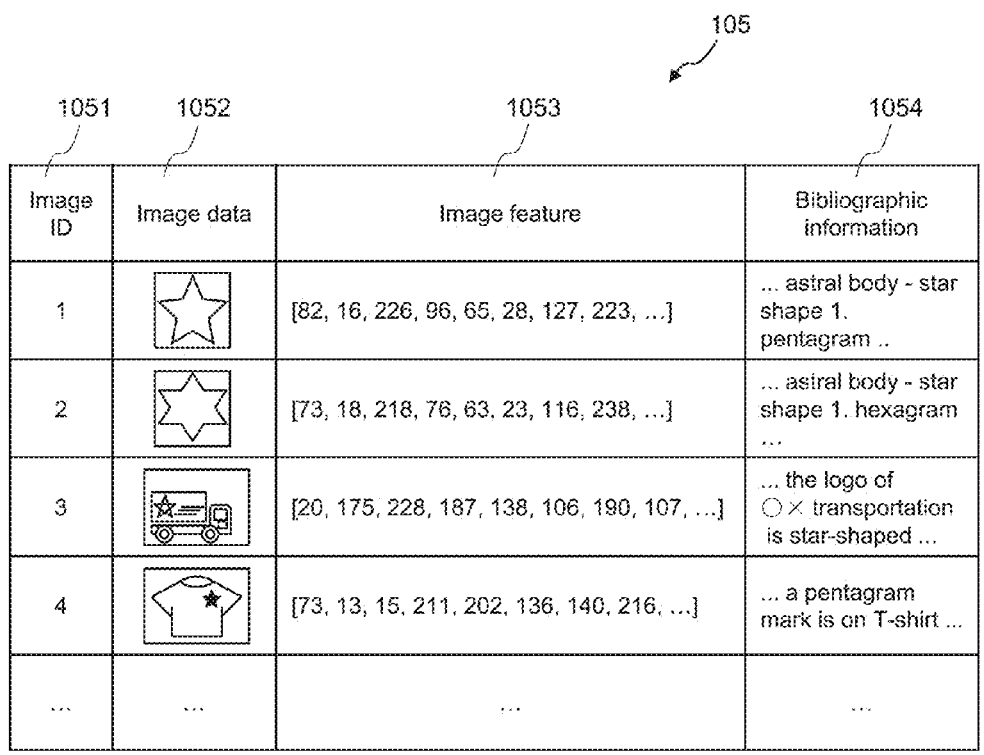 | [82, 16, 226, 96, 65, 28, 127, 223, ...] | ... astral body - star shape 1. pentagram .. |
| 2 |  | [73, 18, 218, 76, 63, 23, 116, 238, ...] | ... astral body - star shape 1. hexagram ... |
| 3 |  | [20, 175, 228, 187, 138, 106, 190, 107, ...] | ... the logo of ○× transportation is star-shaped ... |
| 4 |  | [73, 13, 15, 211, 202, 136, 140, 216, ...] | ... a pentagram mark is on T-shirt ... |
| ... | ... | ... | ... |

FIG. 11
(a) Using existing bibliographic information only
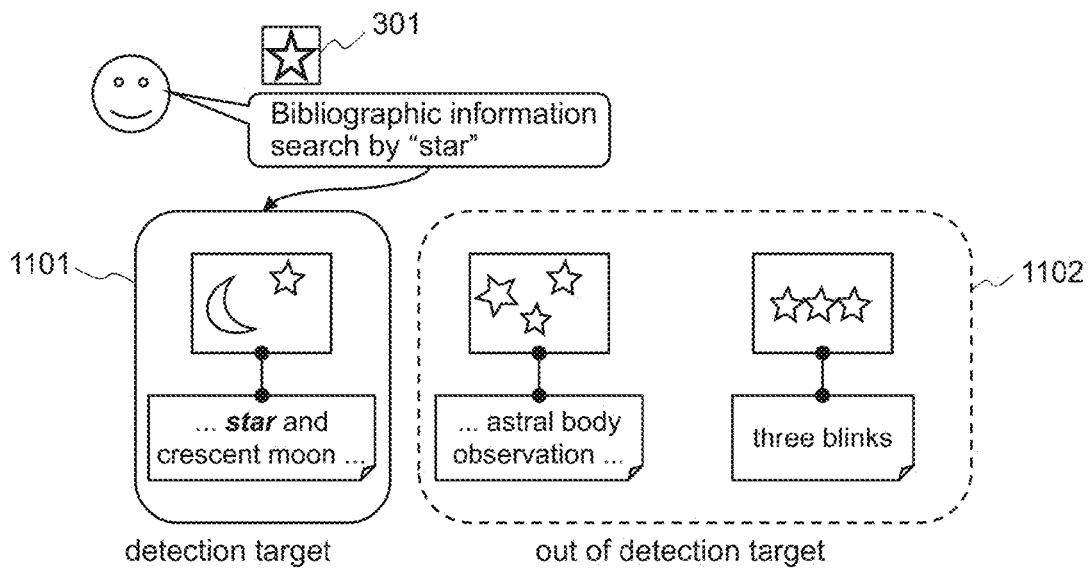
(b) Using extended bibliographic information
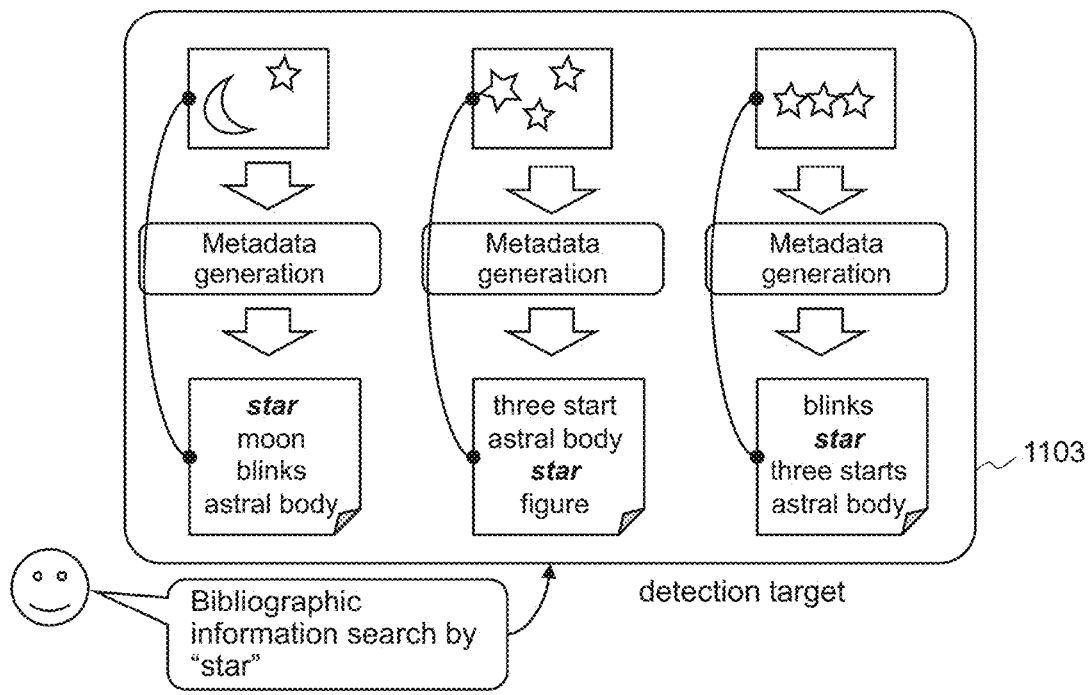

FIG. 13
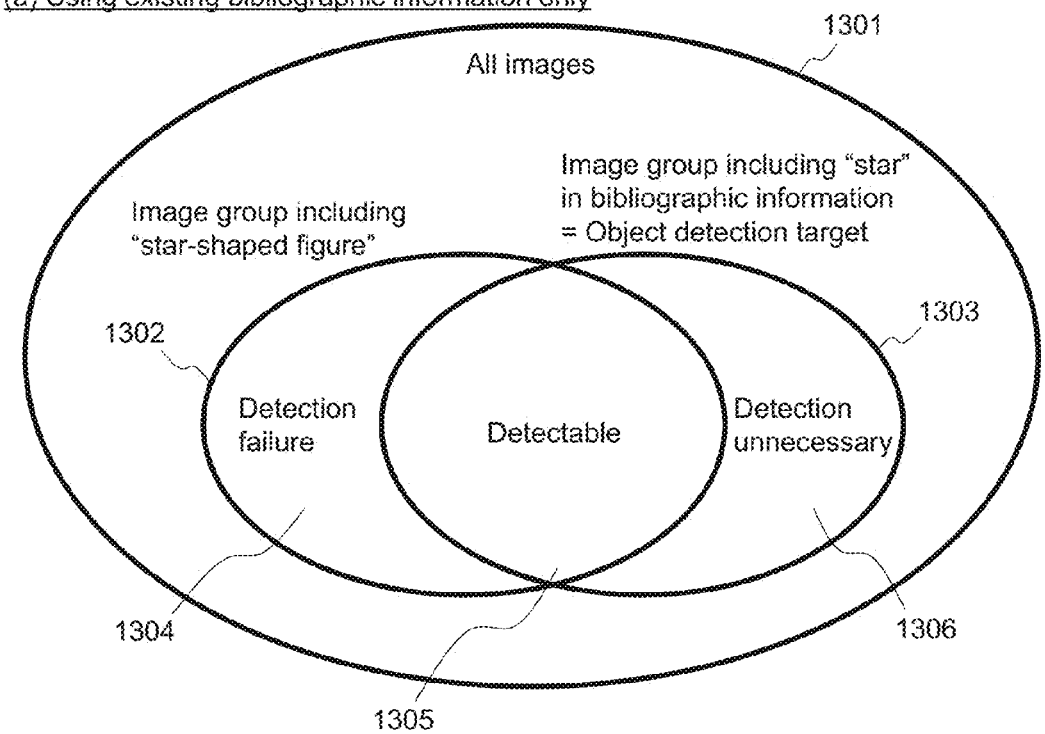
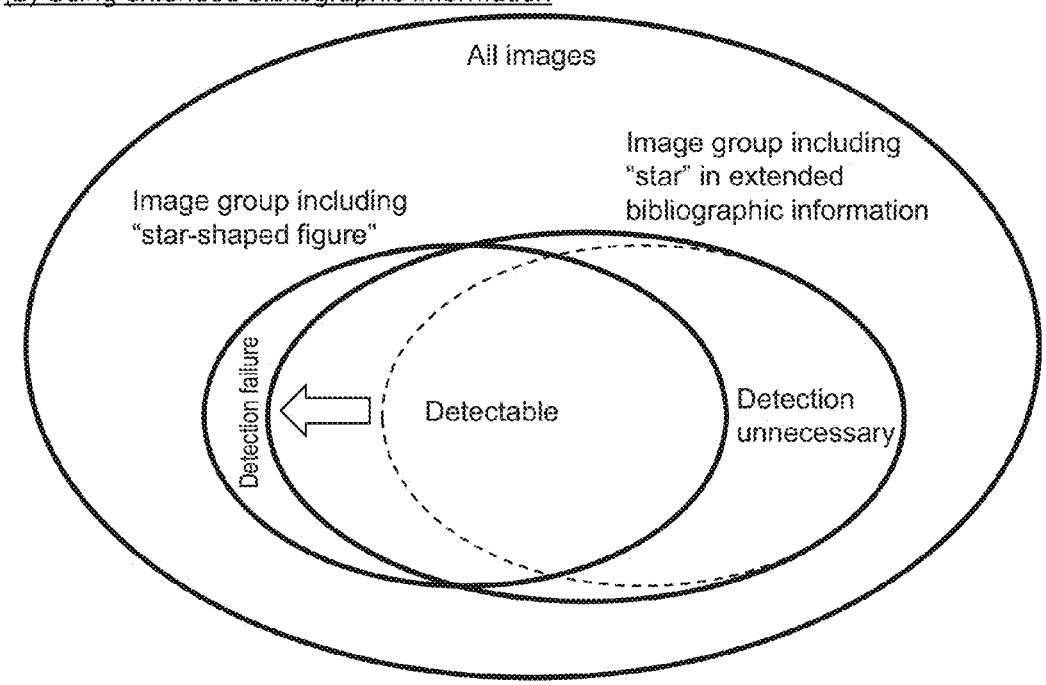

DEVICE AND METHOD FOR DETECTING SPECIFIED OBJECTS IN IMAGES USING METADATA

TECHNICAL FIELD

The present invention relates to a technique for detecting specific objects included in image data.

BACKGROUND ART

Along with development in IT infrastructures for persons/in companies, a huge amount of multimedia data (such as documents, videos/images, voices, or various log data) has been stored in large storages. In order to extract information efficiently from vast amount of stored data, various information search techniques for individual media data have been invented and put into practical use.

As an example of information search with respect to multimedia data, a method may be assumed for detecting objects or specific regions included in images. Object detection or region identification in images correspond to morphological analysis in document analysis (means for separating documents into words to determine word classes), which are important in analyzing meanings of images.

As a method for detecting objects in images, the method of Non Patent Literature 1 is commonly known, and is commercialized as face region detecting function in digital cameras or in monitoring systems. In the method of Non Patent Literature 1, vast amount of image samples of the detection target is collected, and multiple of discriminators on the basis of image brightness are generated by machine learning. These discriminators are combined to generate a determinator for partial regions of the image. The object region is identified by thoroughly searching the partial regions in the image.

The detection targets are usually human faces currently. However, if wide ranges of contents stored in storages are the detection targets, it is desired to detect various objects such as cars, animals, buildings, diagrams, or various goods. In addition, in order to process huge size data, it is required to improve efficiency of analysis process.

Regarding improvement in efficiency of analysis process, Patent Literature 1 listed below describes a method for utilizing existence probability of objects, thereby limiting the region to which image processing for detecting object regions is performed. The method of Patent Literature 1 utilizes static information of imaging system such as focal point distance or resolution, thereby determining regions to which image processing is performed. It may be advantageous in environments where imaging environments or imaging devices are limited such as in-vehicle cameras and where structured data is managed.

CITATION LIST

Patent Literature

Patent Literature 1: JP Patent Publication (Kokai) 2010-003254 A

Non Patent Literature

Non Patent Literature 1: P. Viola and M. Jones, "Robust real-time object detection". IJCV2001, Vol. 57, No. 2. pp. 137-154, 2002.

SUMMARY OF INVENTION

Technical Problem

The technique described in Patent Literature 1 assumes that the imaging environment is specified to some degree and target data for image processing is structured. However, the imaging environment or the photographic subject is not always predictable in advance generally. In addition, in environments where the target data for image processing is generated in ad hoc manner, such data is not structured. In such environments, the method described in Patent Literature 1 may not be advantageous for reducing the time to detect objects.

The technique described in Non Patent Literature 1 is effective if the detected target is predefined such as in face detection. However, in such applications where users sequentially specify different detection targets, it is individually necessary to collect samples or to perform machine learning, thus not practical in terms of processing time.

The present invention is made in the light of the above-described technical problems. It is an objective of the present invention to provide image analysis techniques that can rapidly detect the targets within image data.

Solution to Problem

An image analysis device according to the present invention: generates metadata of query images including the detection target; narrows the image data for search targets using the metadata in advance; and performs object detection.

Advantageous Effects of Invention

With the image analysis device according to the present invention, it is possible to rapidly extract images including any object from vast amount of image data.

Technical problems, configurations, and effects other than mentioned above will be understood with reference to the following embodiments.

BRIEF DESCRIPTION OF DRAWINGS

FIG. 2 is a diagram showing a configuration and a data example of an image database 105.

FIG. 11 is a diagram showing an example extending bibliographic information.

FIG. 13 is a Venn diagram showing analyzed targets for explaining a process in which detection failure is decreased by extending bibliographic information.

DESCRIPTION OF EMBODIMENTS

Embodiment 1: System Configuration

Figure 1:
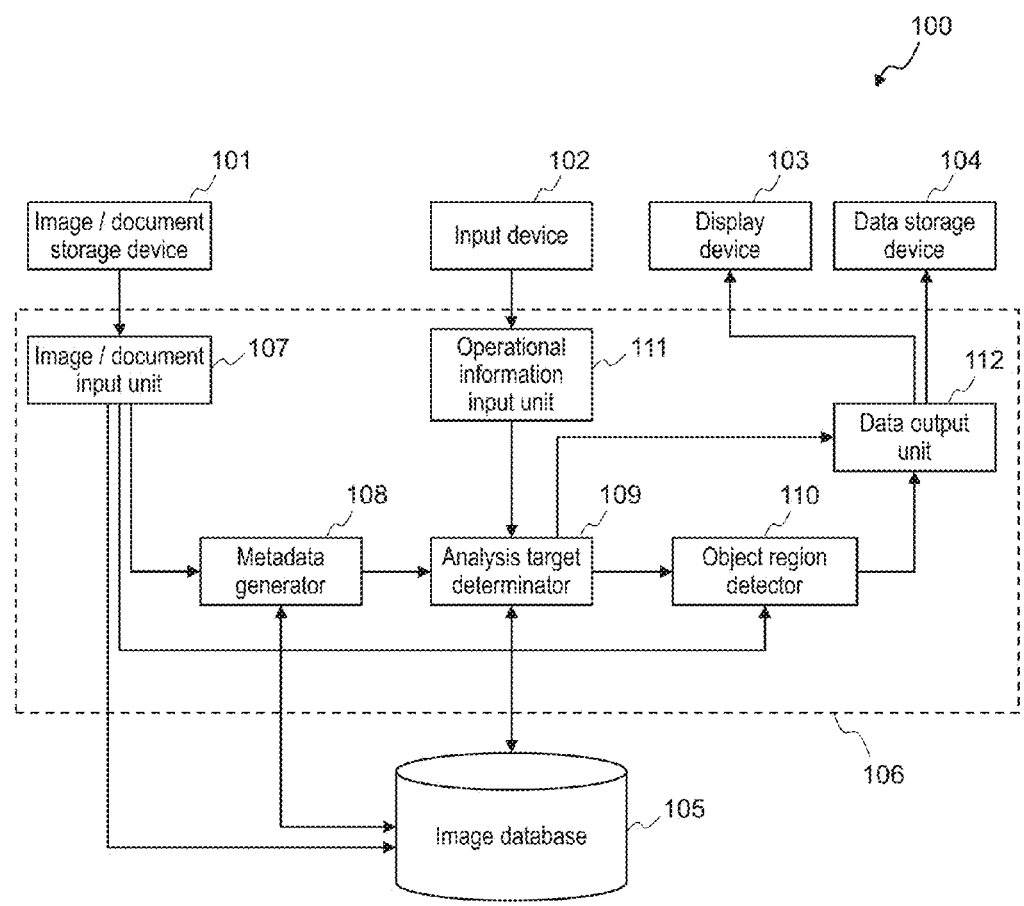
FIG. 1 is a configuration diagram of an image analysis system 100 according to an embodiment 1.

FIG. 1 is a configuration diagram of an image analysis system 100 according to an embodiment 1 of the present invention. The image analysis system 100 is a system which objective is to search images including any object specified by a user among vast amount of images. The image analysis system 100 includes an image/document storage device 101, an input device 102, a display device 103, a data storage device 104, an image database 105, and an image analysis device 106.

The image/document storage device 101 is a storage medium storing image data. The image/document storage device 101 may be configured using storage systems connected to networks, such as NAS (Network Attached Storage) or SAN (Storage Area Network). It is assumed that the size of image data analyzed by the image analysis system 100 is, for example, several hundreds thousand pieces of image data.

The input device 102 is an input interface for transferring user operations to the image analysis device 106 such as mouse, keyboard, or touch device. The display device 103 is an output interface such as liquid crystal display. The display device 103 is used for such as displaying image analysis results of the image analysis device 106, or for interactive operations with users. The data storage device 104 is a storage storing analysis results of the image analysis device 106. The data storage device 104 is used for upper applications to utilize the analysis results.

The image database 105 is a database management system for storing images. The image database 105 not only temporarily stores analyzed data but also is utilized in the analysis process itself as a dictionary for generating metadata. Details will be described later using FIG. 2.

The image analysis device 106 is a device that detects, among image data stored in the image database 105, objects included in the query image specified by the user. The image analysis device 106 includes an image/document input unit 107, a metadata generator 108, an analysis target determinator 109, on object region detector 110, an operational information input unit 111, and a data output unit 112.

The image/document input unit 107 reads out, from the image/document storage device 101, image data to be stored in the image database 105 and its related bibliographic information. The image/document input unit 107 associates these information with each other and stores them into the image database 105. The image document input unit 107 also reads out the query image including the detection target object, and passes the query image to the metadata generator 108 and to the object region detector 110.

The metadata generator 108 automatically generates metadata of the query image by image recognition process using the image database 105 as a dictionary. The metadata mentioned here is highly abstractive data included in image data. For example, metadata is information such as words describing the image, creation date, or creation location. Hereinafter, for the sake of simplicity, it is assumed that "metadata=word". However, the metadata generator 108 may generate various metadata. A reliability value is assigned to metadata. The generated metadata is sent to the analysis target determinator 109. The sequence for generating metadata will be described later using FIG. 5.

The analysis target determinator 109 searches the bibliographic information stored in the image database 105 using the metadata generated by the metadata generator 108 as a search key, thereby acquiring a list of image data having the bibliographic information matching with the search key. The metadata used as the search key may be automatically selected according to its reliability, or may be selected by the user from candidates of metadata. If the user selects the metadata used as the search key, a list of metadata candidates or the hit number of search result are presented to the user through the data output unit 112 in order to perform an interactive operation between the user and the image analysis device 106. In addition, search parameters such as the metadata specified as the search key or thresholds are received from the operational information input unit 111. The image list acquired by above is sent to the object region detector 110 as candidates for analysis target.

The object region detector 110 identifies, using an image analysis process, coordinates of the region from the image where the specified object is present. The detection target is not fixed and may be specified by the user each time. In addition, objects with various concepts (e.g. human face, car, cat, star mark, etc.) may be the detection target simultaneously. The analysis result is sent to the data output unit 112 as a coordinate of the rectangle region of the object (e.g. [horizontal coordinate of left-top of the rectangle, vertical coordinate of left-top of the rectangle, horizontal coordinate of right-bottom of the rectangle, vertical coordinate of right-bottom of the rectangle]) and a reliability value indicating "likelihood of object". At this time, the metadata generated by the metadata generator 108 may be outputted in association with the analysis result as meaning information of the detected object.

The operational information input unit 111 receives a user operation from the input device 102, and sends its signal to the image analysis device 106. The data output device 112 receives the image list for image analysis or image analysis result, and outputs them to the display device 103 and to the data storage device 104.

FIG. 2 is a diagram showing a configuration and a data example of the image database 105. A configuration example with table format is shown here. However, any data format is allowed. The image database 105 is a database that stores image features and bibliographic information associated with each other. The image database 105 includes an image ID field 1051, an image data field 1052, an image feature field 1053, and a bibliographic information field 1054.

The image ID field 1051 stores identifiers of each image data. The image data field 1052 is a field that stores image data in binary format, and is used when the user checks the analysis result. The image feature field 1053 stores numerical vector data with fixed length by which features of the image itself such as color or shape are quantified. The bibliographic information field 1054 stores bibliographic information (such as sentence, category, date and time, location) associated with the image. The bibliographic information field may be separated into multiple fields if necessary.

Embodiment 1: Operations of Each Units

Overall configurations of the image analysis system 100 have been described so far. Hereinafter, the operational principle of the image analysis system 100 will be summarized, and then detailed operations of each functional units will be described.

The image analysis system 100 searches, from the database 105 using image recognition process, image data in which the object included in the query image specified by the user is included. In a simplified manner, an object detection process may be performed with respect to all images in the image database 105. However, the processing speed of object detection is usually slow. Thus it is not practical to perform object detection processes with respect to all of vast amount of all image sets.

For example, it is assumed that 0.5 second of image recognition process is required for each image. Then 140 hours is necessary to analyze one million images. If the detected object is limited to "front face of human", an analyze process is performed only once when building the database and the analysis result may be reused for subsequent analysis processes to reduce processing time. However, if the detected object is not fixed and any specified object is to be detected, it is necessary to perform the analysis process after the user specifies the object to be detected. Thus the response time may be problematic.

Thus the image analysis system 100 automatically generate the metadata of the detection target object, and attempts to reduce the processing time by narrowing, using the metadata, the image data to which the object detection process is performed.

Figure 3:
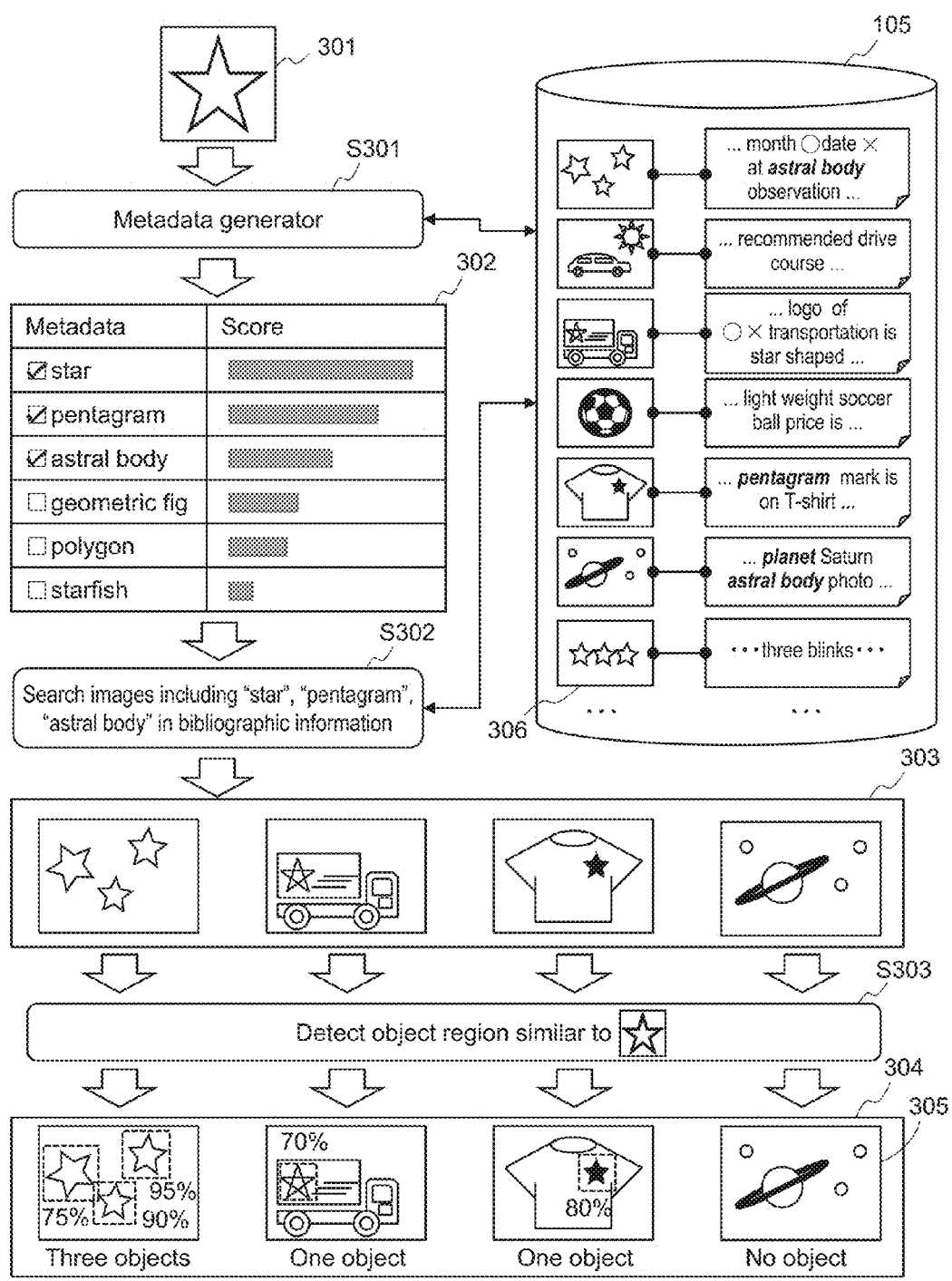
FIG. 3 is a diagram showing a dataflow explaining a sequence to generate metadata of a query image specified by a user and to narrow an object detection target using the metadata.

FIG. 3 is a diagram showing a dataflow explaining a sequence to generate metadata of the query image specified by the user and to narrow the object detection target using the metadata. As shown in FIG. 3, it is assumed that image data and bibliographic information are already stored in the image database 105.

The query image 301 is the query image inputted by the user through the image/document input device 107. It is assumed here that only one object (star shape) is present in the query image 301.

The metadata generator 108 generates metadata 302 of the query image 301 (S301). The metadata 302 is outputted in a list with scores (=reliabilities of metadata). Details of generation of the metadata 302 will be described later using FIG. 5.

The analysis target determinator 109 searches, using the metadata generated by the metadata generator 108 as a search key, the bibliographic information matching with the search key from the image database 105, thereby acquiring a group 303 of image data matching with the search condition (S302). An example is shown where an OR search of three words "star", "pentagram", "astral body" is performed. However, AND search may be combined if necessary. In the image having metadata similar to the search target image, it is highly likely that there is the object therewithin.

The object region detector 110 identifies the region of each image in the image group 303 where objects similar to the object included in the query image 301 are present (S303). The processing time of this process is increased according to the number of images included in the image group 303. Details of object detection will be described later using FIG. 7.

The detection result 304 is described, for each of images in the image group 303, along with the number of detected objects, with the location of the object (dotted rectangle in the detection result 304), and with the reliability of "likelihood of object" (percentage in the detection result 304), for example. As the meaning information of each detected objects, the metadata generated in step S301 may be associated with the detection result 304. The data output unit 112 displays the detection result 304 on the display device 103, or outputs the detection result 304 as data into the data storage device 104.

As shown in FIG. 3, the image analysis system 100 performs object detection after limiting the images that are highly likely to include the detection target object using the metadata of the query image 301. Thus it is possible to reduce the processing time.

On the other hand, the "appearance" of the image does not always match with the bibliographic information in terms of meaning. In the example of image 305, the bibliographic information matches with the search key but the "appearance" of the object is different. In the example of image 306, although the image includes an object which "appearance" is similar, the bibliographic information does not include words matching with the condition. The former example increases the processing time because of redundant image analysis process. The latter example causes detection failure. A method for decreasing detection failure will be described in an embodiment 2.

Figure 4:
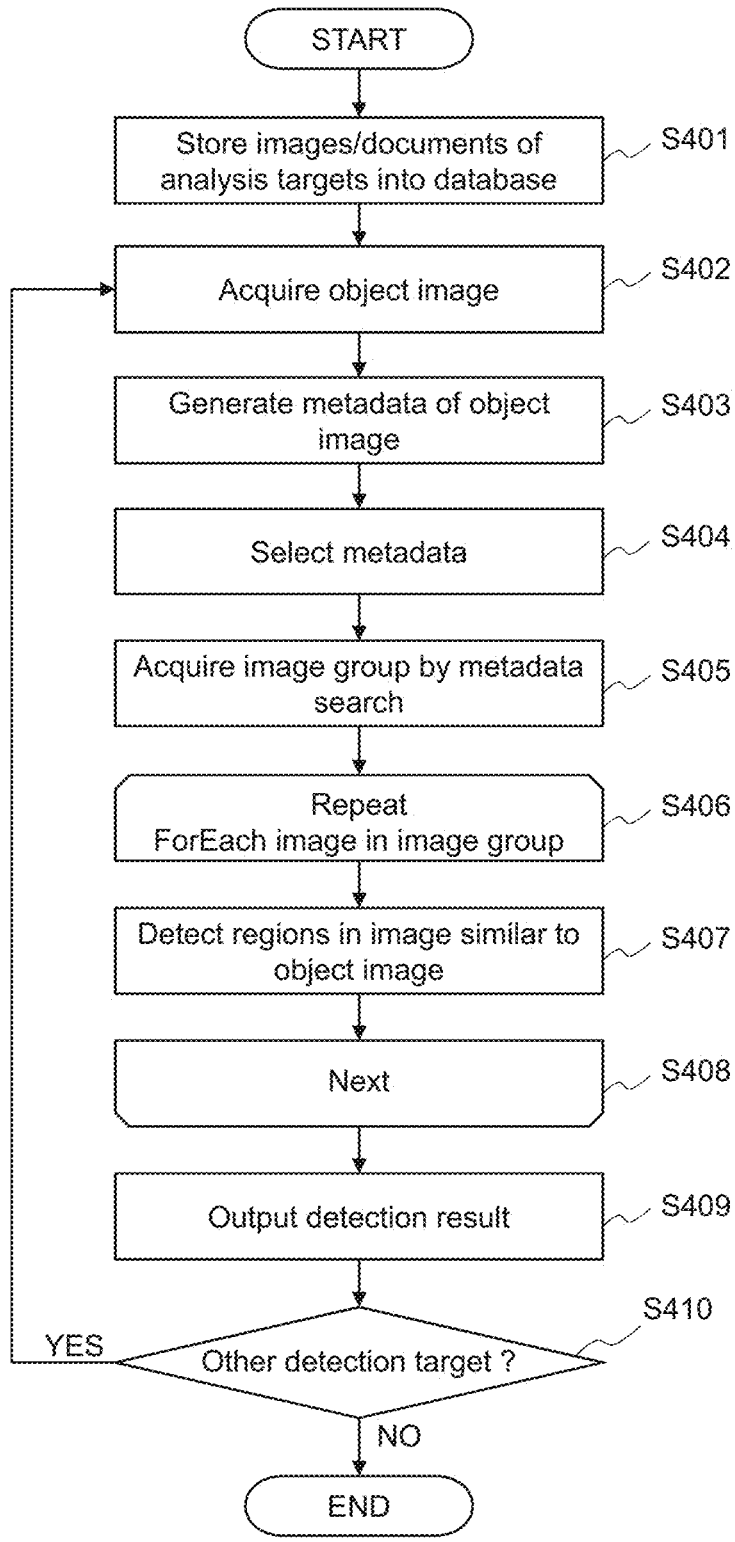
FIG. 4 is a flowchart showing a process by the image analysis system 100 to identify an object region in an image.

FIG. 4 is a flowchart showing a process by the image analysis system 100 to identify the object region in the image. Hereinafter, each step in FIG. 4 will be described.

(FIG. 4: Step S401)

The image/document input unit 107 stores the received image data and the bibliographic information into the image database 105. The image database 105 extracts the image feature from the image data, and stores the image feature in association with the bibliographic information. The image/document input unit 107 may perform the process for extracting the image feature. This step may be performed before performing step S402 and subsequent steps. It is not necessary to perform this step every time when performing this flowchart.

(FIG. 4: Steps S402-S403)

The image/document input unit 107 acquires the query image including the detection target object (S402). The metadata generator 108 generates the metadata of the query image (S403). Details will be described later using FIG. 5.

(FIG. 4: Step S404)

The analysis target determinator 109 determines, among the metadata generated by the metadata generator 108 in step S403, the metadata that is used for narrowing the image data to which the object detection is performed. Specifically, it may be determined mechanically according to the reliability of the metadata (e.g. automatically selecting from those with higher reliabilities within a predetermined range). Alternatively, the metadata may be presented to the user through the data output unit 111 and the user may select anyone of the presented metadata.

(FIG. 4: Step S405)

The analysis target determinator 109 searches the bibliographic information stored in the image database 105 using the metadata selected in step S404 as a search key, thereby acquiring a group of image data matching with the search key. This image group is the target for the object detection process.

(FIG. 4: Steps S406-S408)

The image analysis device 106 performs step S407 with respect to each of the image data included in the image group acquired in step S405. In step S407, the object region detector 110 extracts, among the images included in the image group acquired in step S405, the region that is similar to the object included in the query image. The method for extracting the object region will be described later using FIG. 7.

(FIG. 4: Step S409)

The data output unit 112 outputs the detection result of object regions detected by the object region detector 110. The detection result may be outputted in the processed order. Alternatively, the detection result may be outputted after sorting it on the basis of the number of detected objects or on the basis of the reliability. Further, as shown in the detection result 304 in FIG. 3, additional information such as the number of detected objects, detection reliability, or the rectangle indicating the detected object region may be outputted along with the detection result. Yet further, the detection result may be outputted on the display through the display device 103, or may be outputted in the form of data describing the detection result and the above-mentioned additional information.

(FIG. 4: Step S410)

If there is not more objects to be detected (if there is no more instruction from the user), this flowchart terminates. If there are other objects in the query image, or other objects are to be detected such as when the user newly specifies another query image, the flowchart returns to step S402 and the same processes will be performed.

Figure 5:
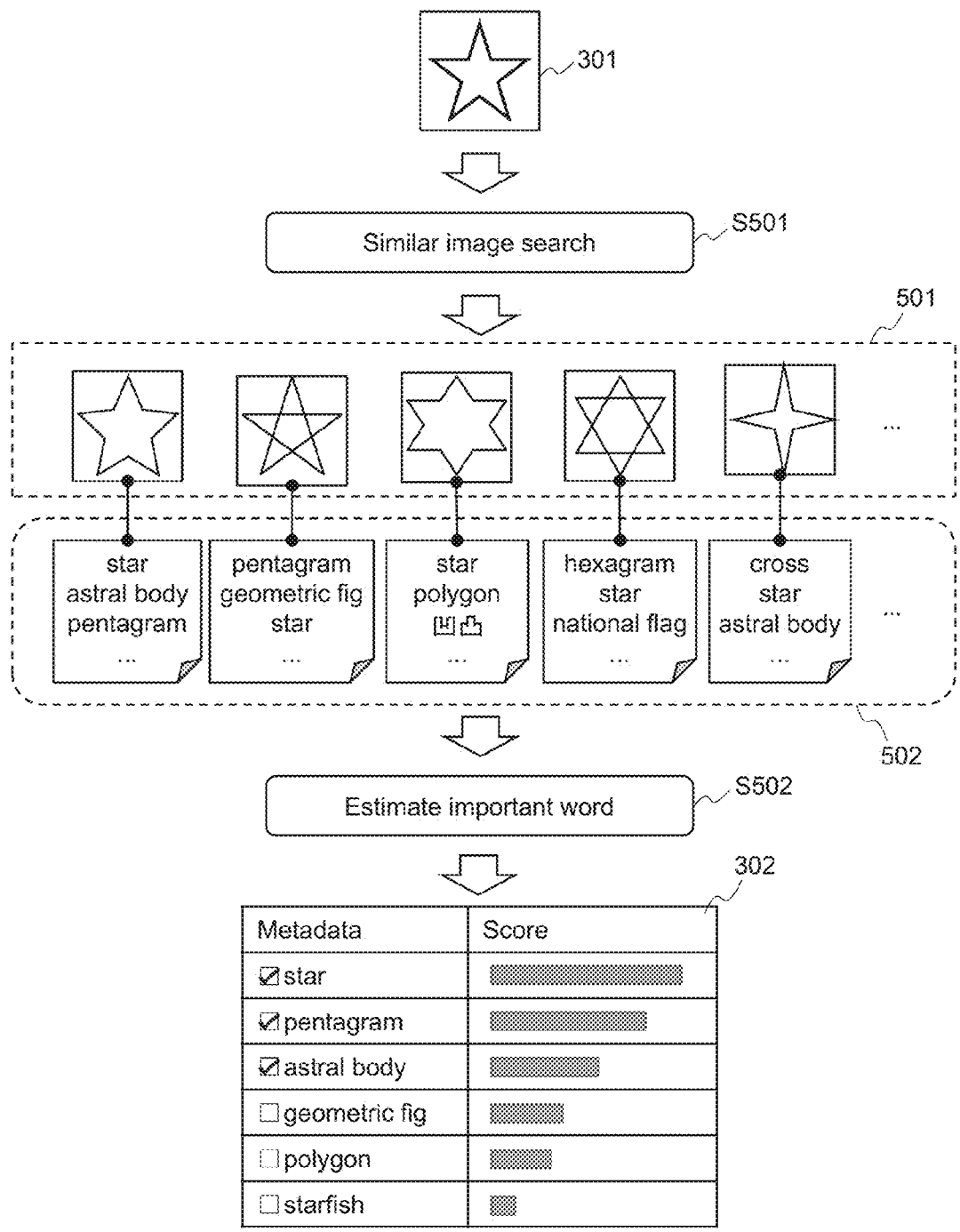
FIG. 5 is a diagram showing a sequence by a metadata generator 108 to generate metadata of the query image.

FIG. 5 is a diagram showing a sequence by the metadata generator 108 to generate metadata of the query image. Hereinafter, each step in FIG. 5 will be described.

(FIG. 5: Step S501)

The metadata generator 108 searches, using the query image 301 as a search key, images similar to the search key from the image database 105. Similar image search is a method for searching similar images by extracting information such as colors or shapes of the image as high order vector information, and by evaluating the similarity between images on the basis of the distance between the vectors. As a result, a group 501 of images which "appearance" are similar to that of the query image 301 is acquired. In addition, the image database 105 stores images and bibliographic information associated with each other, thus a group 502 of bibliographic information is acquired from the group 502 of similar images.

(FIG. 5: Step S502: Sequence 1)

The metadata generator 108 extracts characteristic words included in the bibliographic information group. It is desirable if organized data such as category codes of images is attached as the bibliographic information. Even if documents such as descriptive texts are attached, such documents are highly likely to include characteristic words showing the meaning of the image. Then in this step, the metadata generator 108 separates each of the bibliographic information into atomic data (minimum unit) (e.g. separates from documents to words), and assumes that the minimum unit is the metadata. Then it is possible to generate the metadata of the query image 301.

(FIG. 5: Step S502: Sequence 2)

The metadata generator 108 counts the frequency by which the metadata generated in the sequence 1 appears in the bibliographic information. The metadata generator 108 calculates, using the appearance frequency, a score of each of the metadata generated in the sequence 1. The appearance frequency may be simply sorted, as the score of the metadata, in descending order of the score. Alternatively, an evaluation indicator in which a weight is attached to the appearance frequency may be used as the score.

(FIG. 5: Step S502: Example of Calculating the Score No. 1)

TF-IDF (Term Frequency-Inverse Document Frequency) may be used as the score of the metadata. TF-IDF is an evaluation indicator in which a frequency tf(t) of the metadata t is multiplied by an inverse document frequency idf(t). The inverse document frequency idf(t) is calculated by Equation 1 below, where N is the number of records in the database, and df(t) is the frequency of the bibliographic information including the metadata t among whole of the database.

[Equation 1]

$$idf(t) = \log \frac{N}{df(t)} \quad \text{(Equation 1)}$$

(FIG. 5: Step S502: Example of Calculating the Score No. 2)

A stochastic evaluation indicator may be used as the score of the metadata. For example, when evaluating a metadata t, the scale kl(t) of the difference of probability distribution between p(t) and q(t) shown in Equations 2-4 below may be used as the score of the metadata, where: q(t) is a probability by which the metadata t is included in the bibliographic information when randomly acquiring images among whole of the database; p(t) is a probability by which the metadata t is included in the bibliographic information when randomly acquiring images among the image group of the similar image search result.

Figure 6:
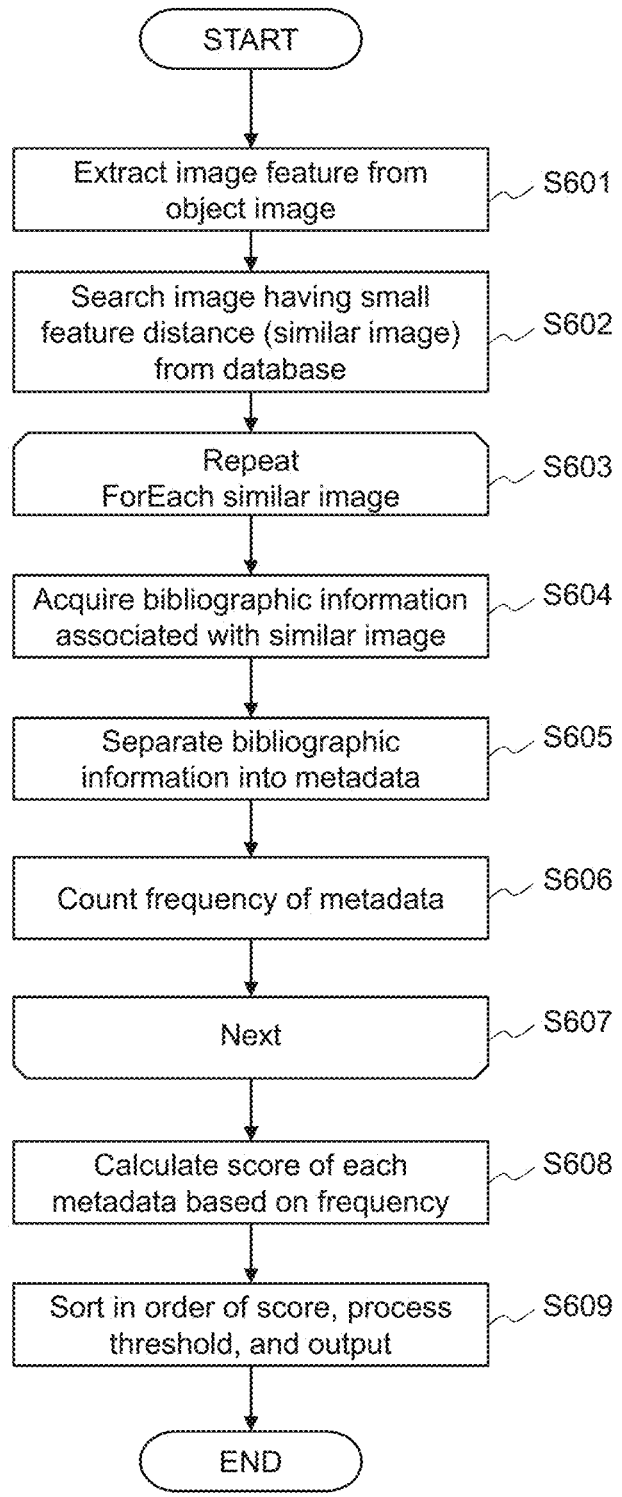
FIG. 6 is s flowchart showing a process sequence by the metadata generator 108 to generate metadata of a query image 301.

[Equation 2]

$$kl(t) = p(t) \log \frac{p(t)}{q(t)} + (1-p(t)) \log \frac{1-p(t)}{1-q(t)} \quad \text{(Equation 2)}$$

$$p(t) = \frac{df'(t)}{M} \quad \text{(Equation 3)}$$

$$q(t) = \frac{df(t)}{N} \quad \text{(Equation 4)}$$

df'(t): frequency of bibliographic information including metadata t in the similar image search result M: number of images in the similar image search result FIG. 6 is s flowchart showing a process sequence by the metadata generator 108 to generate the metadata of the query image 301. Hereinafter, each step in FIG. 6 will be described.

(FIG. 6: Steps S601-S602)

The metadata generator 108 calculates the image feature of the query image 301 (S601). The metadata generator 108 performs a similar image search using the image feature extracted in step S601 as a search key (S602). The smaller the distance between the feature vectors of each of the images is, the higher the similarity between the images is. The search result is sorted according to the distance, and then is outputted.

(FIG. 6: Steps S603-S607)

The metadata generator 108 performs steps S604-S606 with respect to the similar images acquired in step S602.

(FIG. 6: Steps S604-S605)

The metadata generator 108 reads out, from the image database 105, the bibliographic information associated with the similar image acquired in step S602 (S604). The metadata generator 108 separates the bibliographic information acquired in step S604 into atomic data, and uses it as the metadata (S605). For example, if the bibliographic information is a document, a morphology analysis is performed to separate the bibliographic information into words. The process for separating the bibliographic information may be performed in advance when storing the document into the image database 105, for the sake of efficiency.

(FIG. 6: Step S606)

The metadata generator 108 counts the frequency by which the metadata generated in step S605 appears in the bibliographic information that is read out in step S604. The metadata generator 108 calculates an accumulated frequency for each of the metadata throughout steps S603-S607. At this time, in order to reflect the image similarity into the frequency of the metadata, the similarity may be weighted and then may be added to the accumulated frequency.

(FIG. 6: Step S608)

The metadata generator 108 calculates the score of the metadata using the accumulated frequency for each of the metadata calculated in steps S603-S607. The method for calculating the score is as described in FIG. 5.

(FIG. 6: Step S609)

The metadata generator 108 sorts the metadata in the order of the score calculated in step S608. The metadata generator 108 excludes the metadata below or equal to a threshold, and outputs the sorted result.

Figure 7:
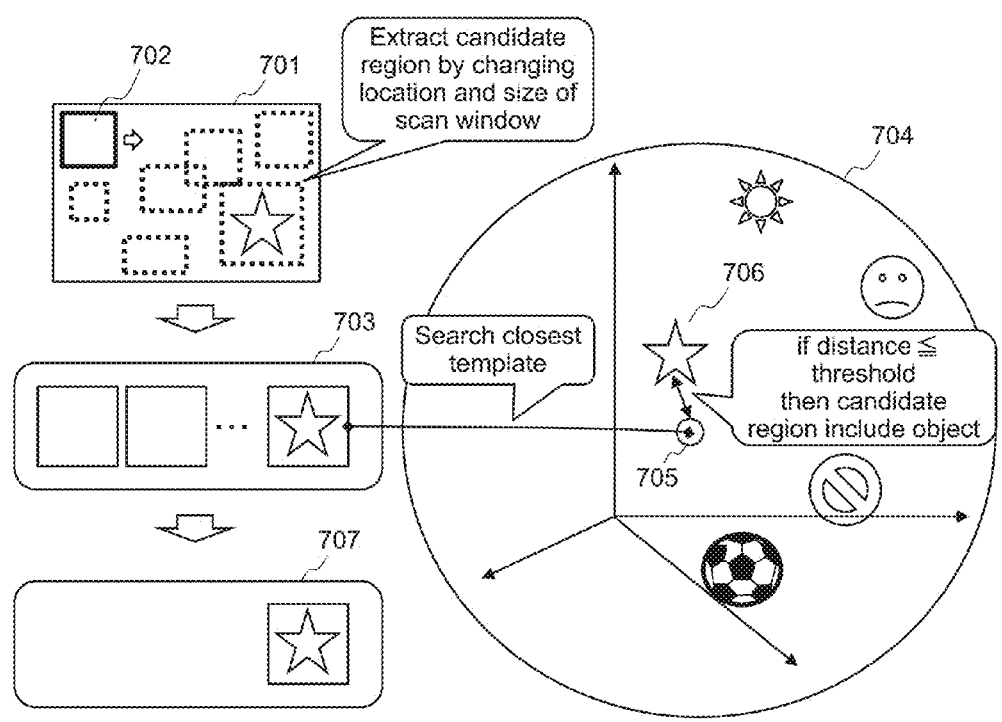
FIG. 7 is a diagram showing a detection method for object regions in step S407 in FIG. 4.

FIG. 7 is a diagram showing a detection method for object regions in step S407 in FIG. 4. This method is for detecting regions where the object is present in the image by using the image of the object to be detected as a template, and by detecting regions matching with the template.

Firstly, an image feature of a typical image (template) of the object to be detected is extracted, and then is stored in a template database 704. The template image mentioned here corresponds to the query image 301. If it is desired to detect multiple objects, for example, the template database 704 may store multiple templates (images of the detection targets) corresponding to each of the objects. The templates stored in the template database 704 are reset every time when the object to be detected changes.

When an input image 701 (an image in the image database 105) that is a target for object detection is given, the object region detector 110 varies location or size of a scan window 702 to extract a candidate region 703 of the object. Next, the object region detector 110 searches templates in the template database 704 which feature vector is the closest to that of the candidate region 703, for all of the candidate regions 703. If the distance between the feature vector of the found template and that of the candidate region 703 is at or below a predetermined threshold, it is determined that the candidate region 703 includes the object of the template, and the candidate region 703 is added to the detection result. At this time, the distance between the feature vector of the closest template and that of the candidate region 703 may be used as a reliability of the detection result.

Figure 8:
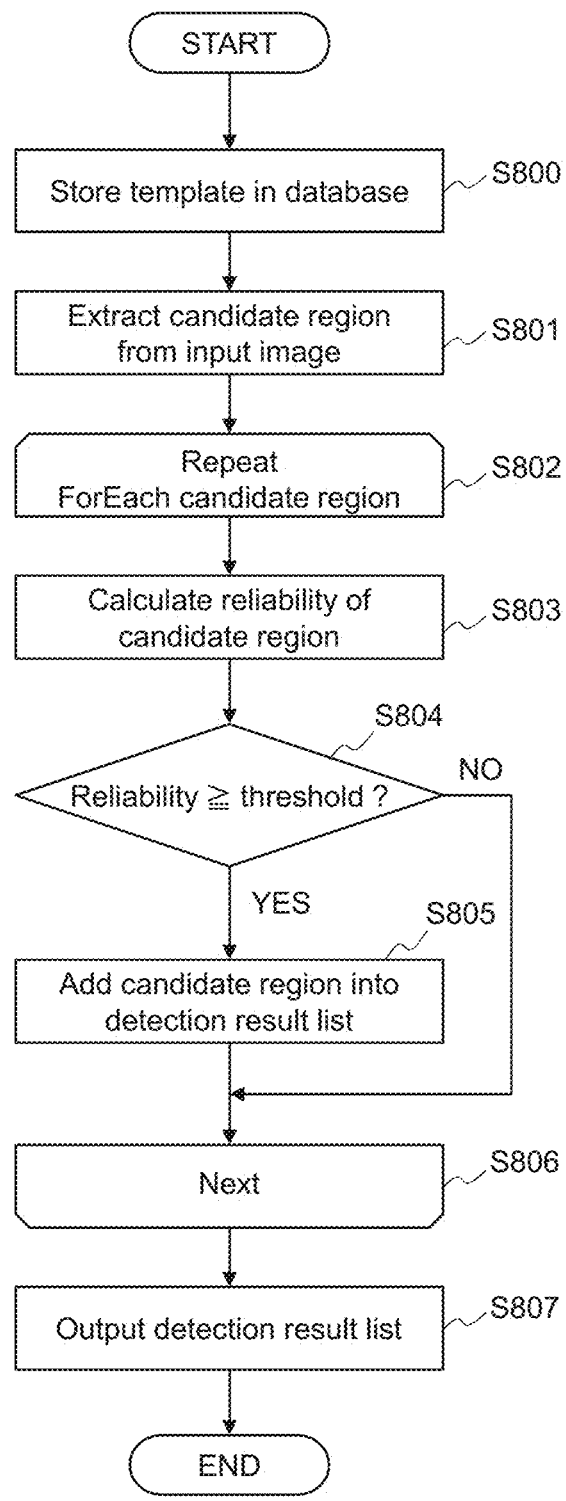
FIG. 8 is a flowchart showing a process for an object region detector 110 to detect an object.

FIG. 8 is a flowchart showing a process for the object region detector 110 to detect the object. Hereinafter, each step in FIG. 8 will be described.

(FIG. 8: Step S800)

The object region detector 110 calculates the feature of the template, and stores it into the template database. If there are multiple of the input images 701 as the object detection target, and if the same template is used to perform the detection process, this step may be performed only once at the first iteration.

(FIG. 8: Step S801)

The object region detector 110 extracts the candidate region 703 in the input image 701. The candidate region 703 is mechanically extracted by moving the scan window for each step or by changing the size of the scan window.

(FIG. 8: Steps S802-S806)

The object region detector 110 performs steps S802-S806 for all of the candidate regions 703.

(FIG. 8: Step S803)

The object region detector 110 calculates the reliability of the candidate region 703. For example, as described in FIG. 7, the distance between the feature of the template and the feature of the candidate region 703 may be used for calculating the reliability.

(FIG. 8: Steps S804-S805)

If the reliability of the candidate region 703 calculated in step S803 is at or below a predetermined threshold, the flowchart proceeds to step S805, otherwise the flowchart skips step S805 (S804). The object region determinator 110 adds the candidate region 703 with the reliability above the predetermined threshold to the detection result list (S805).

(FIG. 8: Step S807)

The object region detector 110 outputs the detection result list, and this process flow terminates. The detection result is outputted as a set of coordinate information in the input image 701 (e.g. [horizontal coordinate of left-top of the rectangle, vertical coordinate of left-top of the rectangle, horizontal coordinate of right-bottom of the rectangle, vertical coordinate of right-bottom of the rectangle]) and the reliability.

Figure 9:
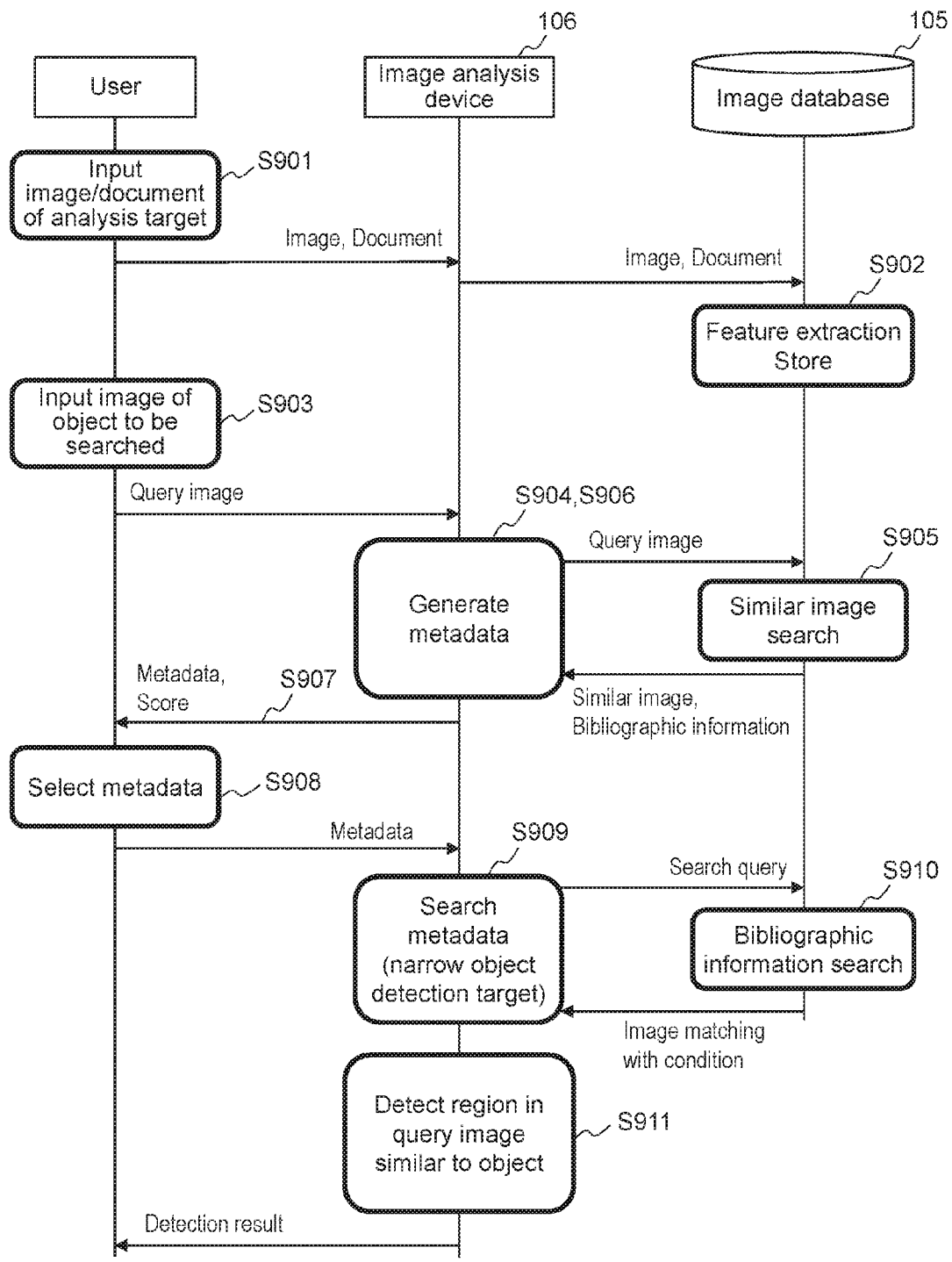
FIG. 9 is a diagram showing a process sequence between each functional units in a process where the image analysis system 100 identifies object regions in images.

FIG. 9 is a diagram showing a process sequence between each functional units in a process where the image analysis system 100 identifies object regions in images. Hereinafter, each step in FIG. 9 will be described.

(FIG. 9: Steps S901-S902)

The user inputs, through the input device 102, images to be stored in the image database 105 and documents associated with the images (S901). The group of images and documents is sent to the image database 105 through the image analysis device 106. The image database 105 extracts features from the images received from the image analysis device 106, and stores the features in association with the bibliographic information acquired from the documents (S902). Steps S901-S902 correspond to step S401 in FIG. 4.

(FIG. 9: Steps S903-S906)

The user inputs an image (query image) of the object to be detected (S903). The image analysis device 106 requests the image database 105 to search similar images using the query image as a search key (S904). The image database 105 extracts image features from the query image, searches images similar to the query image using the image features, and responds the similar image and its bibliographic information to the image analysis device 106 (S905). The image analysis device 106 generates the metadata of the query image using the bibliographic information received from the image database 105, and calculates the score of the metadata (S906).

(FIG. 9: Steps S907-S908)

The image analysis device 106 presents the metadata generated in step S906 and its score to the user through the display device 103 or through the data storage device 104 (S907). The user selects the metadata that is used for narrowing the images to be searched with reference to the metadata and its score (S908). It is possible for the image analysis device 106 to automatically select the metadata such as by omitting step S908 and by selecting the metadata from higher scores sequentially.

(FIG. 9: Steps S909-S910)

The image analysis device 106 requests the image database 105 to search, using the metadata selected by the user in step S908 as a search key, images which bibliographic information matches with the search key (S909). The image database 105 searches the bibliographic information corresponding to the search query, and responds the image associated with the bibliographic information to the image analysis device 106 (S910).

(FIG. 9: S911)

The image analysis device 106 detects objects included in the query image for each of the images acquired in step S910, thereby identifying the regions similar to the query image. The detection result is described with coordinates of the rectangle of the object in the image (e.g. [horizontal coordinate of left-top of the rectangle, vertical coordinate of left-top of the rectangle, horizontal coordinate of right-bottom of the rectangle, vertical coordinate of right-bottom of the rectangle]) and the reliability indicating "likelihood of object". The detection result is outputted through the data output unit 112.

Figure 10:
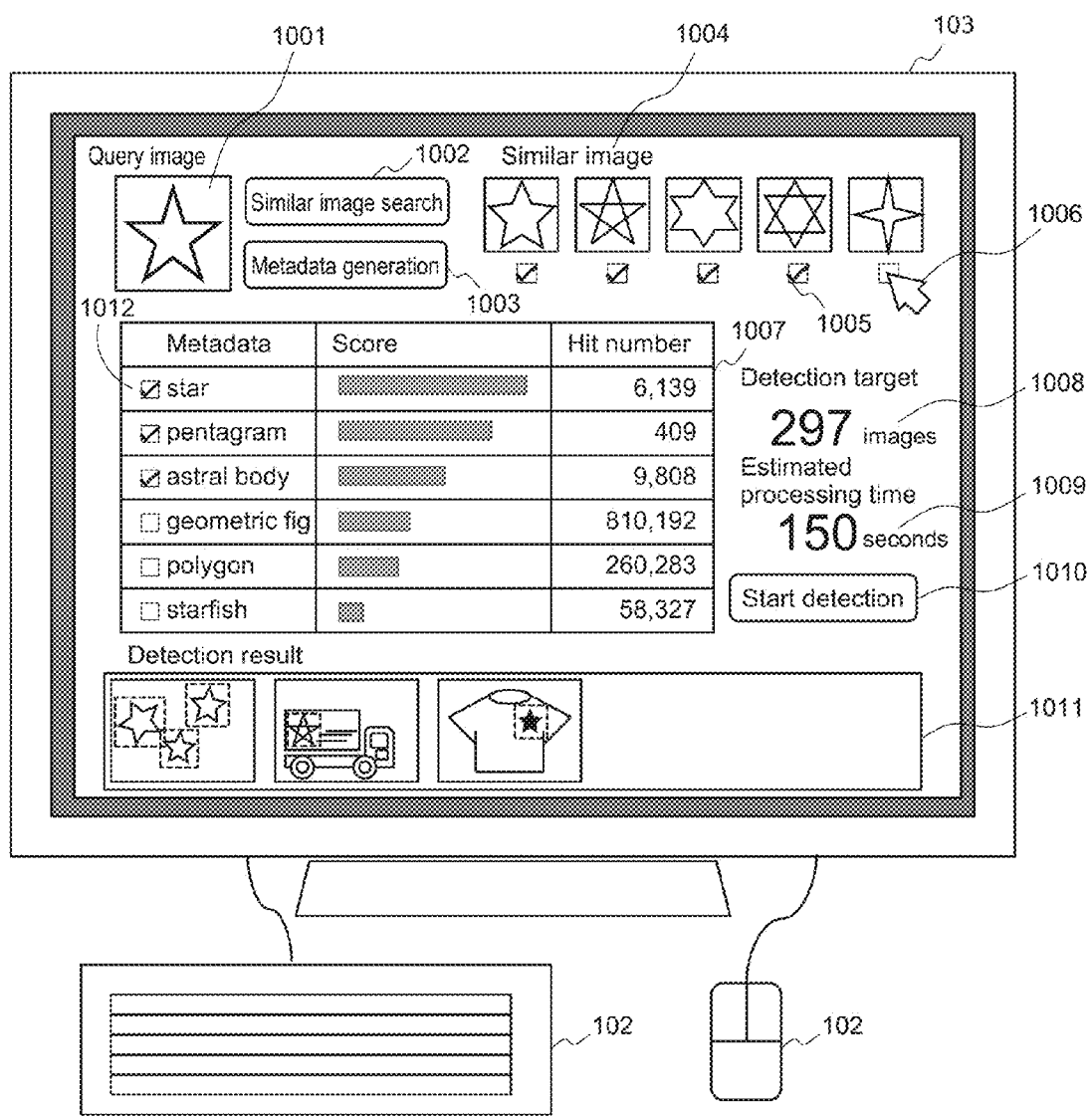
FIG. 10 is a diagram showing a configuration example of an operational screen that is used for acquiring images including specified objects from the image database 105.

FIG. 10 is a diagram showing a configuration example of an operational screen that is used for acquiring images including specified objects from the image database 105. This screen may be provided on the display device 103. The user sends operational information to the operational information input unit 111 by operating a cursor 1006 displayed in the screen using the input device 102.

The operational screen in FIG. 10 has a query image input area 1001, a similar image search button 1002, a metadata generation button 1003, a similar image display area 1004, a metadata display area 1007, a detection target number display area 1008, a predicted processing time display area 1009, a detection start/stop button 1010, and a detection result display area 1011.

The user firstly inputs a query image stored in the image/document storage device 101 into the query image input area 1001. A dialog specifying file paths in the file system may be used, for example. Alternatively, intuitive operations may be used such as drag & drop.

When the user clicks the similar image search button 1002, the image analysis device 106 acquires the image similar to the query image from the image database 105, and displays it in the similar image display area 1004. The image analysis device 106 generates the metadata of the query image using the bibliographic information of the similar image displayed in the similar image display area 1004. The metadata may be generated using all of the similar images. Alternatively, the user checks the similar images and specifies the similar image to be used. The user uses a checkbox 1005 to specify the similar image, for example. In the example shown in FIG. 10, the checkbox of the rightmost similar image is disabled so that the similar image will not be used when generating the metadata.

When the metadata generation button 1003 is clicked, the metadata generator 108 generates the metadata using the bibliographic information associated with the selected similar image, and displays the generated metadata in the metadata display area 1007. The metadata display area 1007 also displays the number of images in which each of metadata is included in the bibliographic information. If the search speed for the bibliographic information is sufficiently fast, the number of images searched by each of metadata alone may also be displayed.

The user selects the metadata that is used for narrowing the images to which the object detection is performed, considering such as the metadata and its score or the number of images. The user selects the metadata using a checkbox 1012, for example. The image analysis device 106 searches the bibliographic information every time when the checkbox 1012 is clicked, and displays the number of images in which the selected metadata is included in the bibliographic information in the detection target number display area 1008. In addition, the predicted processing time for performing object detection with respect to that number of images is displayed in the predicted processing time display area 1009. The processing time may be approximately calculated according to the number of images to which object detection is performed. This enables the user to efficiently select the metadata.

When the detection start/stop button 1010 is clicked, the analysis target determinator 109 acquires, using the metadata selected through the above-described operations, a group of images to which object detection is performed. The object region detector 110 performs object detection with respect to the image group. The detection processes performed by the object region detector 110 are independent for each of the images. Thus the processed images may be displayed in the detection result display area 1011 sequentially in the processed order, or the process may be started/stopped every time when the detection start/stop button 1010 is clicked.

Embodiment 1: Summary

As discussed thus far, the image analysis system 100 according to the embodiment 1 performs object detection only for image data including the metadata of the query image as the bibliographic information. This enables efficiently narrowing the target images for object detection among vast amount of images, thereby rapidly searching the images including the object specified by the user.

The image analysis system 100 according to the embodiment 1, for example in searches or examinations of picture trademarks, may be used when determining whether figures that are to be newly registered are used in registered picture trademarks. In this case, category codes or descriptive texts may be utilized as the bibliographic information of the image required for generating the metadata.

The image analysis system 100 according to the embodiment 1 may be applied to auction sites or shopping sites. This enables rapidly searching products including patterns or marks specified by the user. In this case, titles of the products or comments from the sellers may be utilized as the bibliographic information of the image.

The image analysis system 100 according to the embodiment 1 may be applied to video contents. This enables checking scenes in which celebrities or landmarks are present and checking the location of such scenes in the frame image. In this case, closed captions or texted voices may be utilized as the bibliographic information of the image.

Embodiment 2

In the image analysis system 100 described in the embodiment 1, the analysis target determinator 109 narrows, by bibliographic information search, the images that are target of object detection. Therefore, even if the object specified by the user is actually included, images without sufficient bibliographic information are not searched and thus are not included in the analysis result. Hereinafter, a method for decreasing detection failure by extending the bibliographic information will be described. Other configurations are approximately the same as those of the embodiment 1. Thus hereinafter differences will be mainly described.

FIG. 11 is a diagram showing an example extending the bibliographic information. For the sake of comparison, FIG. 11(a) shows a conceptual diagram of search without extending the bibliographic information and FIG. 11(b) shows a conceptual diagram of search extending the bibliographic information in the embodiment 2.

As shown in FIG. 11(a), the image analysis system 100 described in the embodiment 1 searches the bibliographic information using metadata "star" as the search condition in order to search images including the object included in the query image 301. As a result, object detection will be performed to an image if the bibliographic information includes "star" as for the image 1101. On the other hand, object detection is not performed to images if the bibliographic information does not include "star" as for the image 1102. However, the image 1102 actually includes regions similar to the query image 301. Thus the object detection fails for the image 1102.

In the embodiment 2, as shown in FIG. 11(b), the metadata is also generated for images stored in the image database 105. The method for generating the metadata may be the same as that for generating the metadata of the query image 301. The newly generated metadata is stored in the image database 105 as additional bibliographic information. The image analysis device 106 also searches the additional bibliographic information when narrowing the images to which object detection is performed. This enables searching images that do not include "star" as the bibliographic information as for the image 1103.

Comparing with images where a single object is present, images where multiple objects are present generally have more variations of "appearance" due to change in layout of objects. Thus it is unlikely that such images are found as images similar to the query image. On the other hand, if an image is found where the similarity to the query image is high and where multiple objects are present, the informational quantity will not be significantly degraded even if the bibliographic information of the similar image is reused.

Figure 12:
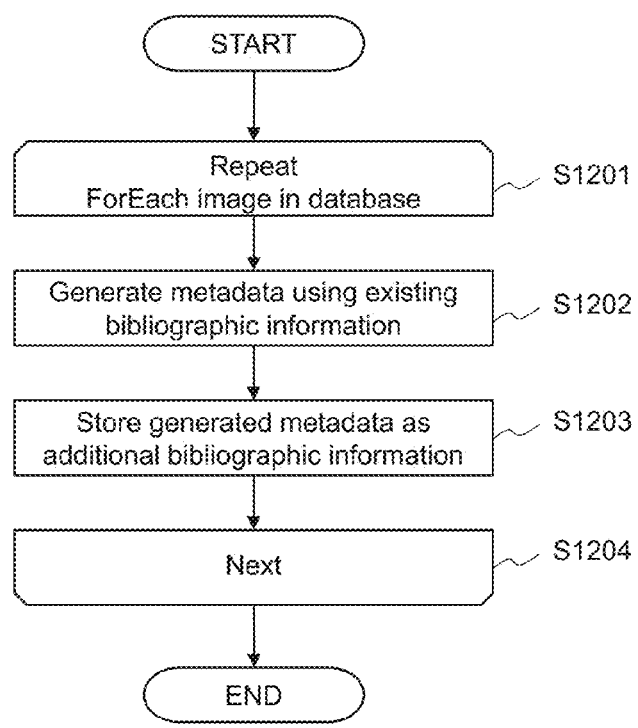
FIG. 12 is a flowchart showing a sequence of the process extending bibliographic information.

FIG. 12 is a flowchart showing a sequence of the process extending the bibliographic information. This flowchart is performed by the metadata generator 108 with respect to all images in the image database 105, where steps S1201-S1204 are repeated. This flowchart may be performed when the system load is small, for example. Alternatively, this flowchart may be performed immediately after images are stored into the image database 105 initially. Hereinafter, each step in FIG. 12 will be described.

(FIG. 12: Step S1202)

The metadata generator 108 generates the metadata of images in the image database 105 using the existing bibliographic information stored in the image database 105. The method for generating the metadata is the same as that shown in FIG. 6. However, the threshold of similarity may be stricter than that of FIG. 6, or image feature may be used that are not changed even if the object layouts vary.

(FIG. 12: Step S1203)

The metadata generator 108 stores the metadata generated in step S1202 into the image database 105 as additional bibliographic information.

FIG. 13 is a Venn diagram showing analyzed targets for explaining a process in which detection failure is decreased by extending the bibliographic information. FIG. 13(a) is a Venn diagram using the existing bibliographic information only. FIG. 13(b) is a Venn diagram using the extended bibliographic information.

In FIG. 13(a), the group 1301 is a group of all images stored in the image database 105. If the object specified by the user is searched without using the image analysis system 100, the group 1301 is the target for image analysis process.

The group 1302 is a group of images including regions of "star-shaped figure" specified by the user. It is desirable if the image analysis system 100 outputs this group.

The group 1303 is an image group acquired by the image analysis system 100 by performing bibliographic information search using an automatically generated metadata "star" is used as a query key. The image analysis system 100 performs object detection to this group.

The group 1304 is an image group to which object detection is not performed because the images include "star-shaped figures" but do not include "star" in the bibliographic information, thus not handled as detection targets.

The group 1305 is an image group that is the target of object detection and that the object is detectable because the images include "star-shaped figure". However, it depends on the identification performance of the object detector whether the object will actually be detected. The method for improving the performance of the object detector will be described later using FIG. 15 in an embodiment 3.

The group 1306 is an image group which does not require object detection because the images include "star" in the bibliographic information but do not include regions similar to "star-shaped figure" specified by the user.

As shown in FIG. 13(b), if the bibliographic information is extended, the group including "star" in the bibliographic information will be enlarged. At this time, since the group is expanded according to the result of similar image search, it is highly likely that the expanded region includes "star-shaped figure". As a result, although the processing time for detecting objects will be increased, detection failure will be decreased.

Figure 14:
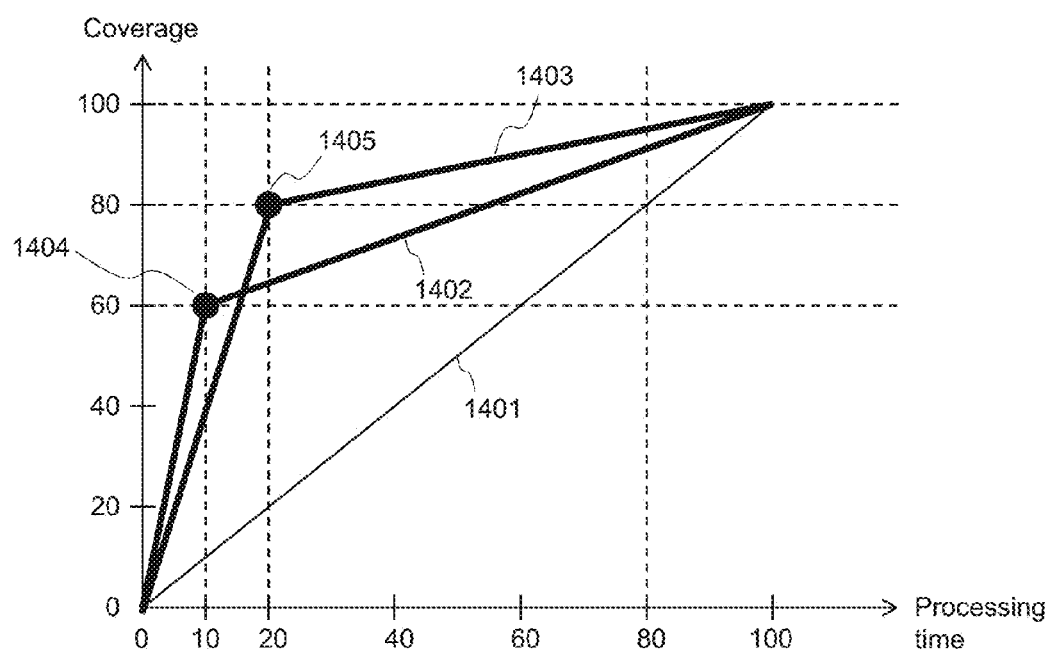
FIG. 14 is a chart showing a relationship between a processing time of image analysis and coverage.

FIG. 14 is a chart showing a relationship between a processing time of image analysis and coverage. The horizontal axis indicates the processing time and the vertical axis indicates the coverage. Coverage means the percentage indicating the processed proportion of the group 1302 in FIG. 13. In the horizontal axis, the processing time 100 is the time when all images to be searched, i.e. the group 1302 in FIG. 13, are analyzed.

In FIG. 14, it is assumed that the proportion occupied by the group 1305 among the group 1302 is 60%, and that the proportion occupied by the group 1304 among the group 1302 is 40%. By extending the bibliographic information, it is assumed that the proportion occupied by the group 1305 among the group 1302 will be 80%, and that the proportion occupied by the group 1304 among the group 1302 will be 20%. In addition, it is assumed that the processing time for performing object detection with respect to the group 1305 is one-tenth of the processing time for performing object detection with respect to the group of all images.

The line 1401 represents for the transition of the coverage by which the coverage changes when all images (the group 1301) are analyzed. The coverage linearly increases if images are randomly picked up from the image database 105.

The polygonal line 1402 represents for the transition of the coverage by which the coverage changes if the analyzed targets are narrowed using the metadata. The line from the start to the point 1404 indicates the detection process with respect to the narrowed images. The line after the point 1404 indicates the detection process with respect to images including other images. At the point 1404, it is understood that 60% of coverage is achieved by the processing time 1/10 of the line 1401.

The polygonal line 1403 represents for the transition of the coverage by which the coverage changes if the analyzed targets are narrowed using the extended bibliographic information according to the method of the embodiment 2. The line from the start to the point 1405 indicates the detection process with respect to the narrowed images. The line after the point 1405 indicates the detection process with respect to images including other images. Although the processing time until the point 1405 is increased because of the increased detection targets, the coverage is improved.

As shown in FIG. 14, the processing time and the coverage are in the trade-off relationship. Thus it is necessary to determine whether the bibliographic information should be extended, depending on the application. When examining picture trademarks, it is sufficient if one similar image is found, thus it is preferred to perform detection process after sufficiently narrowing the processed targets to obtain highly responsive system. If it is desired to improve the coverage, the original bibliographic information may be used first and then additional bibliographic information may be used if necessary.

Embodiment 2: Summary

As discussed thus far, the image analysis system 100 according to the embodiment 2 generates the metadata of images stored in the image database 105, adds the generated metadata into the image database 105 as new bibliographic information, and performs the same process as that of the embodiment 1. This enables covering images that are not detected by using the existing bibliographic information only.

Embodiment 3

In an embodiment 3 of the present invention, a method for improving accuracy of object detection by utilizing intermediate data during the process of the image analysis system 100. This method uses multiple templates described in FIG. 7 for detecting objects. Other configurations are approximately the same as those of the embodiments 1-2. Thus hereinafter similar image search using multiple templates when generating the metadata of the query image will be mainly described.

Figure 15:
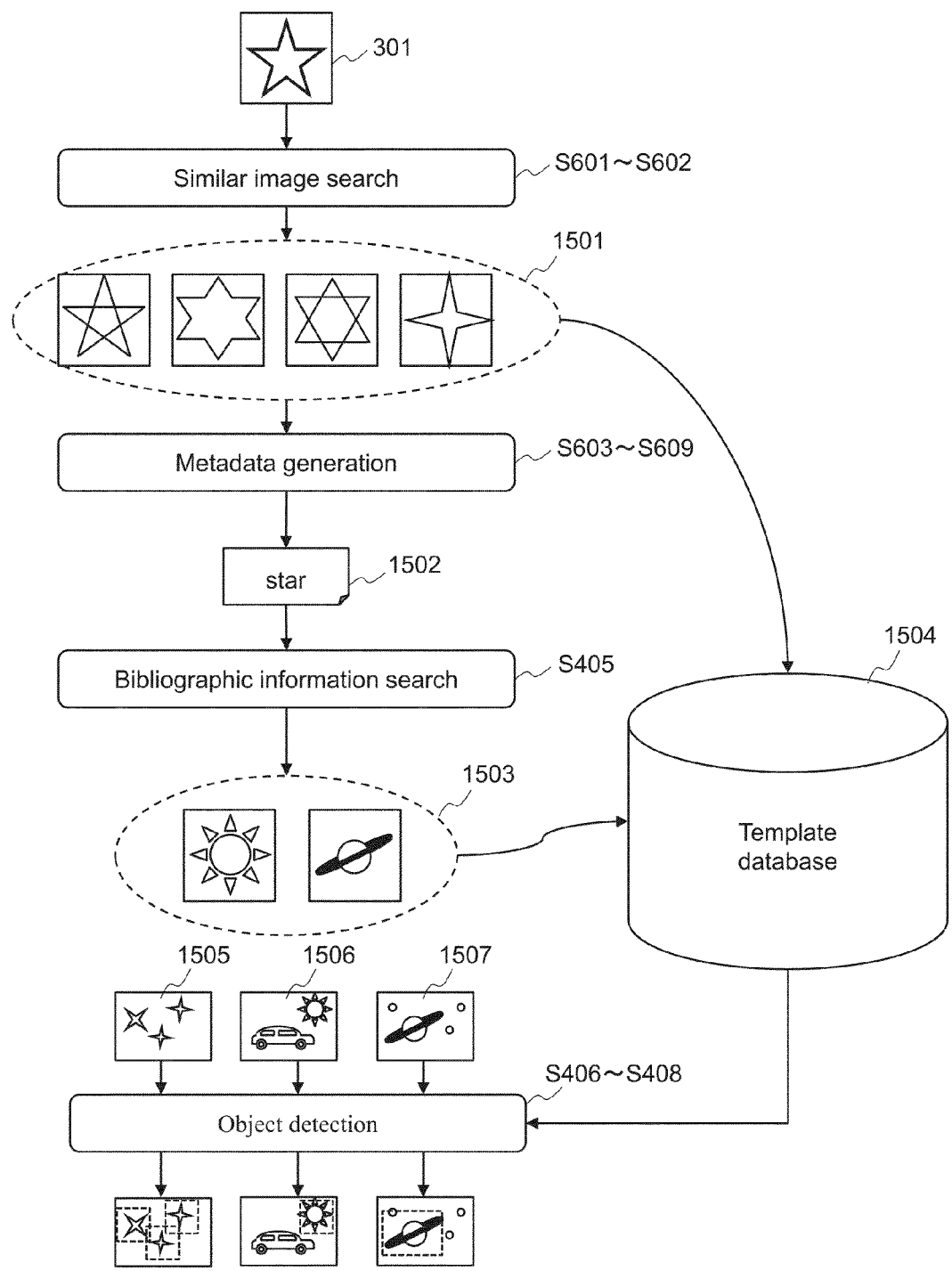
FIG. 15 is a diagram showing a method for increasing accuracy of object detection by expanding templates that are used in searching images similar to the query image.

FIG. 15 is a diagram showing a method for increasing accuracy of object detection by expanding templates that are used in searching images similar to the query image. Hereinafter, expanding templates in the embodiment 3 will be described using FIG. 15.

In the object detection method described in FIG. 7, the object region is identified by checking portions of the image, the templates, and the similarity. Thus if only the query image 301 is used as the template, it is impossible to detect star shapes with significantly different appearances such as the image 1505. In addition, "solar shape" such as the image 1506 or "planet shape" such as the image 1507 cannot be detected even if those images have the same concept of "star".

The image analysis device 106 according to the embodiment 3 uses, as additional templates, the intermediate data generated during the process. Specifically, the image group 1501 acquired as images similar to the query image 301 during generating the metadata of the query image 301 is used as the template for object detection. In other words, not only the object specified by the user but also objects similar to the specified object are targets for object detection. Thus in the embodiment 3, the template of the target object is expanded using similar images acquired by similar image search performed for generating the metadata.

The image analysis device 106 searches images similar to the query image 301 according to the method described in FIG. 6 (S601-S602). The appearances of the image group 1501 do not completely match with the query image 301. However, since those images are close to the object specified by the user, those images may be appropriate as templates when performing object detection later. Thus those similar images are stored in a template database 1504. The template database 1504 is a database that temporarily stores templates that are used when performing object detection. The template database 1504 is reset every time when the query image 301 is changed.

The image analysis device 106 generates the metadata of the query image 301 and of the image group 1501 according to the method described in FIG. 6. Now it is assumed that metadata "star" is generated, for example.

The image analysis device 106 searches the bibliographic information matching with the metadata "star". As a result, the image groups 1505-1507 including the image 1503 corresponding to the concept of "star" are acquired. The result of bibliographic information search may be images including multiple objects or may include many noises as described in FIG. 13. Templates may be selected through interactive operations with the user using operational screens such as FIG. 10. For example, the images acquired by bibliographic information search may be displayed on the operational screen, and then the user may select, among the displayed images, images that will be used as templates in object detection.

The image analysis device 106 performs object detection with respect to the image groups 1505-1507 using multiple templates stored in the template database 1504. For example, the image group 1501 is used as the template in addition to the query image 301. If the user specifies the image 1503 as the template on the operational screen, it is further used as the template. This enables detecting star-shaped regions (e.g. solar shape or Saturn shape such as the image 1503) which appearances are not similar to that of the query image 301.

Embodiment 3: Summary

As discussed thus far, the image analysis device 106 according to the embodiment 3 uses, as expanded templates for object detection, similar images acquired when generating the metadata of the query image 301 or images acquired when searching the bibliographic information. This enables detecting objects which concept is the same but which "appearance" is different.

Embodiment 4

In an embodiment 4 of the present invention, a configuration example will be described where the image analysis system 100 is embedded into a content cloud system. Hereinafter, a summary of the content cloud system will be described first. Then a method for embedding the image analysis system 100 into the content cloud system as an analysis module will be described. The configuration of the image analysis system 100 is the same as that of the embodiments 1-3.

Figure 16:
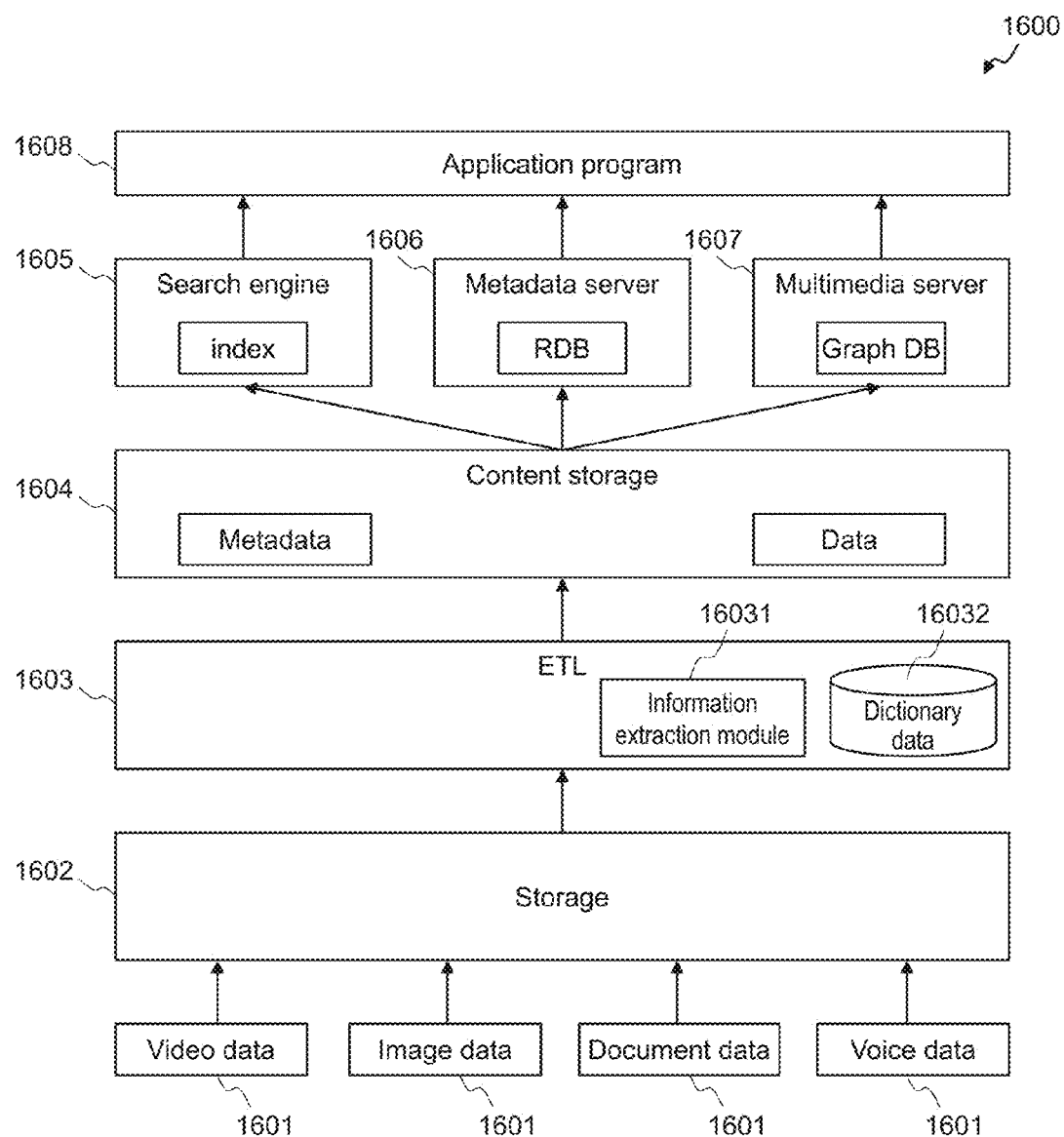
FIG. 16 is a schematic diagram of a content cloud system 1600 according to an embodiment 4.

FIG. 16 is a schematic diagram of a content cloud system 1600 according to the embodiment 4. The content cloud system 1600 includes an Extract Transform Load (ETL) module 1603, a content storage 1604, a search engine 1605, a metadata server 1606, and a multimedia server 1607. The content cloud system works on common computers comprising one or more CPUs, memories, and storage devices. The system itself comprises various modules. Each of the modules may be executed on independent computers. In such cases, each of storages and modules are connected by networks. The system is implemented by distributed process performing data communications through the network.

The application program 1608 sends a request to the content cloud system 1600 through the network. The content cloud system 1600 sends, to the application 1608, information according to the request.

The content cloud system 1600 receives, as inputs, any form of data 1601 such as video data, image data, document data, or voice data. The data 1601 is, for example, picture trademark and its gazette document, website images and HTML documents, or video data with closed captions or with voices. The data 1601 may be structured data or non-structured data. The data inputted to the content cloud system 1600 is temporarily stored in the storage 1602.

The ETL 1603 monitors the storage 1602. When the data 1601 is stored into the storage 1602, the ETL 1603 activates the information extraction module 16031. The extracted information (metadata) is archived in the content storage 1604.

The information extraction module 16031 includes, for example, a text index module and an image identification module. Examples of metadata may be such as time, N-gram index, image recognition result (object name, region coordinate in image), image feature and its related word, or voice recognition result. Any program that extracts some information (metadata) may be used as the information extraction module 16031. Since commonly known techniques may be employed, details of the information extraction module 16031 are omitted here. If necessary, the metadata may be compressed using data compression algorithm. After the ETL 1603 extracts the information, information such as data filename, data registration date, original data type, or metadata text information may be stored in Relational Data Base (RDB).

The content storage 1604 stores the information extracted by the ETL 1603 and the data 1601 before processed that is temporarily stored in the storage 1602.

When requested from the application program 1608, the search engine 1605 performs text search according to the index created by the ETL 1603 in the case of text search, and sends the search result to the application program 1608. Commonly known techniques may be applied as the algorithm of the search engine 1605. The search engine 1605 may include not only modules for searching texts but also modules searching data such as images or voices.

The metadata server 1606 manages the metadata stored in the RDB. For example, it is assumed that data filenames, data registration dates, original data types, or metadata text information extracted by the ETL 1603 are stored in the RDB. When requested from the application 1608, the metadata server 1606 sends the information in the RDB according to the request.

The multimedia server 1607 associates the metadata information extracted by the ETL 1603 with each other, and stores the meta information in structured manner of graph format. An example of association is: with respect to a voice recognition result of "apple" stored in the storage 1604, a relationship between original voice file, image data, or related words may be represented in network format. When requested from the application 1608, the multimedia server 1607 sends corresponding meta information to the application 1608. For example, if a request of "apple" is received, the metadata server 1607 sends, according to the built graph structure, meta information related in the network graph such as images including apple, average price, or song name of artist.

In the content cloud system 1600, the image analysis system 100 works as the information extraction module 16031 in the ETL 1603. The image/document storage device 101 and the data storage device 104 in FIG. 1 correspond to the storage 1602 and the content storage 1604 in FIG. 16 respectively. The image analysis device 106 corresponds to the information extraction module 16031. If multiple of the information extraction module 16031 is embedded into the ETL 1603, resources of one computer may be shared or independent computers may be used for each of the modules. The image database 105 in FIG. 1 corresponds to the dictionary data 16032 that is required by the ETL 1603 to extract information.

Embodiment 4: Summary

As discussed thus far, the image analysis system 100 according to the present invention may be applied to components of the content cloud system 1600. The content cloud system 1600 may integrate information across media by generating metadata that is commonly usable among each media data. This enables providing highly valued information to users.

The present invention is not limited to the embodiments, and various modified examples are included. The embodiments are described in detail to describe the present invention in an easily understood manner, and the embodiments are not necessarily limited to the embodiments that include all configurations described above. Part of the configuration of an embodiment can be replaced by the configuration of another embodiment. The configuration of an embodiment can be added to the configuration of another embodiment. Addition, deletion, and replacement of other configurations are also possible for part of the configurations of the embodiments.

The configurations, the functions, the processing units, the processing means, etc., may be realized by hardware such as by designing part or all of the components by an integrated circuit. A processor may interpret and execute programs for realizing the functions to realize the configurations, the functions, etc., by software. Information, such as programs, tables, and files, for realizing the functions can be stored in a recording device, such as a memory, a hard disk, and an SSD (Solid State Drive), or in a recording medium, such as an IC card, an SD card, and a DVD.

REFERENCE SIGNS LIST

100: image analysis system
101: image/document input device
102: input device
103: display device
104: data storage device
105: image database
106: image analysis device 107: image/document input unit
108: metadata generator
109: analysis target determinator
110: object region detector
111: operational information inout unit
112: data output unit
1600: content cloud system
1602: storage
1603: ETL module
1604: content storage
1605: search engine
1606: metadata server
1607: multimedia server
1608: application program

The invention claimed is:

1. An image analysis device comprising:
   at least one processor executing stored instructions to:
   receive query image data including an image of an object to be searched;
   determine and identify one or more images similar to the image of the object to be searched, wherein the one or more similar images are selected by a user during a first interactive selection;
   generate metadata of the query image data using image data and its bibliographic information associated with the selected one or more similar images, the one or more similar images being stored in an image database;
   calculate a score for each metadata based on a frequency by which each of the metadata appears in the bibliographic information of the image data;
   determine and identify one or more metadata to be used as a search key, the determination being based on one or more of the calculated score for each metadata and a second interactive selection different from the first interactive selection by the user of the one or more metadata, wherein the one or more metadata of the search key is selected by the user and differently combinable when used;
   extract one or more of the image data stored in the image database, the extracted image data having the bibliographic information matching with the one or more metadata of the search key;
   detect, in one or more of the extracted image data, a region including the image of the object; and
   output a detected result.

2. The image analysis device according to claim 1, wherein the at least one processor further executes stored instructions to:
   search the image data stored in the image database, the searched image data being similar to the query image data,
   and generate the metadata using the bibliographic information of the searched image data.

3. The image analysis device according to claim 2, wherein the at least one processor further executes stored instructions to:
   receive a similar image designation specifying the image data among the searched image data that is used for generating the metadata of the query image data,
   search, among the image data stored in the image database, the image data similar to the query image data and the image data specified by the similar image designation,
   and generate the metadata using the bibliographic information of the image data acquired by the search.

4. The image analysis device according to claim 1, wherein the at least one processor further executes stored instructions to
   extract the image data associated with the bibliographic information matching with the metadata, using the metadata within a predetermined range sequentially from higher one of the scores as a search key.

5. The image analysis device according to claim 1, wherein the at least one processor further executes stored instructions to:
   receive a metadata designation specifying the metadata used for extracting the image data matching with the bibliographic information,
   and extract the image data that is associated with the bibliographic information matching with the specified metadata.

6. The image analysis device according to claim 5,
   further comprising a display that displays a number of the image data which is a target for the at least one processor to detect a region including an image of the object, and that displays a processing time to perform the detection,
   and wherein the at least one processor further executes stored instructions to recalculate the number of the image data and the processing time every time when receiving the metadata designation, and reflects a result of the recalculation on the display.

7. The image analysis device according to claim 1, wherein the at least one processor further executes stored instructions to:
   calculate a distance between a feature vector of a partial region of the image data and a feature vector of the query image data,
   and determine, depending on whether the distance is within a predetermined range, whether the object included in the query image data is included in the partial region.

8. The image analysis device according to claim 1, wherein the at least one processor further executes stored instructions to
   output, along with a detected result, a number of the detected object in the image data.

9. The image analysis device according to claim 1, wherein the at least one processor further executes stored instructions to
   output, along with a detected result, a detection reliability of the detected object in the image data.

10. The image analysis device according to claim 1, wherein the at least one processor further executes stored instructions to:
    generate metadata of one of the image data stored in the image database using other one of the image data stored in the image database, and add the generated metadata as the bibliographic information,
    and extract, using the bibliographic information where the metadata is added, the image data among the image data stored in the image database, the bibliographic information of the extracted image data matching with the metadata of the query image data.

11. The image analysis device according to claim 1, wherein the at least one processor further executes stored instructions to detect, among one or more of the extracted image data, a region including an image of the object and a region including an image of an object included in the acquired image data in the search.

12. The image analysis device according to claim 11, wherein the at least one processor further executes stored instructions to:
   receive a detection target designation specifying, among the acquired image data, the image data including an object that is to be detected along with the object included in the query image data,
   and detect, among one or more of the extracted image data, a region including an image of the object and a region including an image of an object included in the specified image data.

13. An image analysis system comprising:
   the image analysis device according to claim 1; and
   an image database that stores image data and its bibliographic information associated with each other,
   wherein the at least one processor further executes stored instructions to generate metadata of the query image data using the image database.

14. An image analysis method comprising:
   receiving query image data including an image of an object to be searched;
   determining and identifying one or more images similar to the image of the object to be searched, wherein the one or more similar images are selected by a user during a first interactive selection;
   generating metadata of the query image data using image data and its bibliographic information associated with the selected one or more similar images, the one or more similar images being stored in an image database;
   calculating a score for each metadata based on a frequency by which each of the metadata appears in the bibliographic information of the image data;
   determining and identifying one or more metadata to be used as a search key, the determining being based on one or more of the calculated score for each metadata and a second interactive selection different from the second interactive selection by the user of the one or more metadata, wherein the one or more metadata of the search key is selected by the user and differently combinable when used;
   extracting one or more of the image data stored in the image database, the extracted image data having the bibliographic information matching with the one or more metadata of the search key;
   detecting, in one or more of the extracted image data; a region including an image of the object; and
   outputting a result detected in the object region detection step.

* * * * *